(12) United States Patent
Ghosh et al.

(10) Patent No.: US 11,169,935 B2
(45) Date of Patent: Nov. 9, 2021

(54) TECHNOLOGIES FOR LOW-LATENCY CRYPTOGRAPHY FOR PROCESSOR-ACCELERATOR COMMUNICATION

(71) Applicant: Intel Corporation, Santa Clara, CA (US)

(72) Inventors: Santosh Ghosh, Hillsboro, OR (US); Luis S. Kida Kida, Beaverton, OR (US); Reshma Lal, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 289 days.

(21) Appl. No.: 16/232,139

(22) Filed: Dec. 26, 2018

(65) Prior Publication Data

US 2019/0132118 A1 May 2, 2019

Related U.S. Application Data

(60) Provisional application No. 62/687,403, filed on Jun. 20, 2018.

(51) Int. Cl.
*G06F 12/14* (2006.01)
*G06F 21/79* (2013.01)
(Continued)

(52) U.S. Cl.
CPC ........ *G06F 12/1408* (2013.01); *G06F 9/3877* (2013.01); *G06F 9/45558* (2013.01);
(Continued)

(58) Field of Classification Search
CPC ............... G06F 12/1408; G06F 9/3877; G06F 9/45558; G06F 12/0802; G06F 21/57;
(Continued)

(56) References Cited

U.S. PATENT DOCUMENTS

| 2006/0126835 A1* | 6/2006 | Kim | ..................... H04L 9/3242 380/44 |
| 2014/0056307 A1* | 2/2014 | Hutchison | ............... H04L 12/56 370/394 |

(Continued)

*Primary Examiner* — Jayesh M Jhaveri
(74) *Attorney, Agent, or Firm* — Jaffery Watson Mendonsa & Hamilton LLP

(57) ABSTRACT

Technologies for secure data transfer include a computing device having a processor, an accelerator, and a security engine, such as a direct memory access (DMA) engine or a memory-mapped I/O (MMIO) engine. The computing device initializes the security engine with an initialization vector and a secret key. During initialization, the security engine pre-fills block cipher pipelines and pre-computes hash subkeys. After initialization, the processor initiates a data transfer, such as a DMA transaction or an MMIO request, between the processor and the accelerator. The security engine performs an authenticated cryptographic operation for the data transfer operation. The authenticated cryptographic operation may be AES-GCM authenticated encryption or authenticated decryption. The security engine may perform encryption or decryption using multiple block cipher pipelines. The security engine may calculate an authentication tag using multiple Galois field multipliers. Other embodiments are described and claimed.

22 Claims, 10 Drawing Sheets

(51) Int. Cl.
| | |
|---|---|
| *H04L 9/06* | (2006.01) |
| *H04L 9/08* | (2006.01) |
| *G06F 21/57* | (2013.01) |
| *G06F 21/64* | (2013.01) |
| *G06F 9/38* | (2018.01) |
| *G06F 21/60* | (2013.01) |
| *H04L 9/32* | (2006.01) |
| *G06F 21/76* | (2013.01) |
| *G06F 9/455* | (2018.01) |
| *H04L 12/24* | (2006.01) |
| *G06F 12/0802* | (2016.01) |

(52) U.S. Cl.
CPC .......... *G06F 12/0802* (2013.01); *G06F 21/57* (2013.01); *G06F 21/602* (2013.01); *G06F 21/606* (2013.01); *G06F 21/64* (2013.01); *G06F 21/76* (2013.01); *G06F 21/79* (2013.01); *H04L 9/0631* (2013.01); *H04L 9/0637* (2013.01); *H04L 9/083* (2013.01); *H04L 9/085* (2013.01); *H04L 9/0838* (2013.01); *H04L 9/0844* (2013.01); *H04L 9/0891* (2013.01); *H04L 9/321* (2013.01); *H04L 9/3215* (2013.01); *H04L 9/3226* (2013.01); *H04L 9/3268* (2013.01); *H04L 9/3278* (2013.01); *H04L 41/28* (2013.01); *G06F 2009/45591* (2013.01); *G06F 2009/45595* (2013.01)

(58) Field of Classification Search
CPC ...... G06F 21/60; G06F 21/602; G06F 21/606; G06F 21/64; G06F 21/76; G06F 21/79; G06F 2009/45591; G06F 2009/45595; H04L 9/06; H04L 9/0631; H04L 9/0637; H04L 9/08; H04L 9/083; H04L 9/0838; H04L 9/0844; H04L 9/085; H04L 9/0891; H04L 9/32; H04L 9/321; H04L 9/3215; H04L 9/3226; H04L 9/3268; H04L 9/3278

See application file for complete search history.

(56) References Cited

U.S. PATENT DOCUMENTS

| | | | |
|---|---|---|---|
| 2014/0177823 A1* | 6/2014 | Gopal | G06F 9/30032 380/28 |
| 2014/0281587 A1* | 9/2014 | Ignatchenko | G06F 21/64 713/193 |
| 2015/0244530 A1* | 8/2015 | Clayton | H04L 9/0637 713/189 |
| 2015/0249654 A1* | 9/2015 | Mundra | H04L 9/3013 726/3 |
| 2017/0093571 A1* | 3/2017 | Satpathy | H04L 9/10 |
| 2018/0062829 A1* | 3/2018 | Suresh | G06F 9/30007 |
| 2019/0013965 A1* | 1/2019 | Sindhu | G06F 13/4282 |

* cited by examiner

TECHNOLOGIES FOR LOW-LATENCY CRYPTOGRAPHY FOR PROCESSOR-ACCELERATOR COMMUNICATION

CROSS-REFERENCE TO RELATED APPLICATION

The present application claims the benefit of U.S. Provisional Patent Application No. 62/687,403, filed Jun. 20, 2018.

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. In particular, SGX provides confidentiality, integrity, and replay-protection to the secure enclave data while the data is resident in the platform memory and thus provides protection against both software and hardware attacks. The on-chip boundary forms a natural security boundary, where data and code may be stored in plaintext and assumed to be secure. Intel® SGX does not protect I/O data that moves across the on-chip boundary.

Modern computing devices may include general-purpose processor cores as well as a variety of hardware accelerators for offloading compute-intensive workloads or performing specialized tasks. Hardware accelerators may include, for example, one or more field-programmable gate arrays (FPGAs), which may include programmable digital logic resources that may be configured by the end user or system integrator. Hardware accelerators may also include one or more application-specific integrated circuits (ASICs). Hardware accelerators may be embodied as I/O devices that communicate with the processor core over an I/O interconnect.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
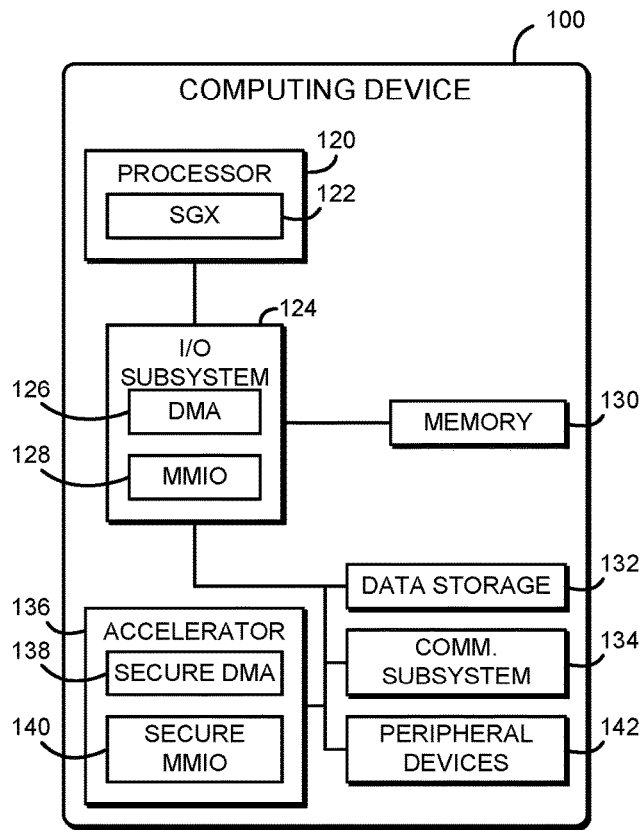
FIG. 1 is a simplified block diagram of at least one embodiment of a computing device for low-latency cryptography for processor-accelerator communication.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures.

Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for low-latency cryptography for processor-accelerator communication includes a processor 120 and an accelerator device 136. The accelerator device 136 includes one or more hardware security engines, illustratively a direct memory access (DMA) engine 138 and a memory-mapped I/O (MMIO) engine 140. In use, as described further below, the computing device 100 initializes the security engine 138, 140, which pre-fills cryptographic pipelines and pre-computes counter values, hash subkeys, and other values. After initialization is complete, the computing device 100 generates DMA or MMIO transactions between the processor 120 and the accelerator device 136, and the respective security engine 138, 140 performs authenticated cryptographic operations (e.g., AES-GCM authenticated encryption or authenticated decryption) on the transferred data in-line. A block of multiple DMA and/or MMIO transactions may be protected without re-initialization of the security engine 138, 140. As described further below, the security engines 138, 140 perform the cryptographic operations with low latency (e.g., 1-2 clock cycles) and high bandwidth, without the need to buffer data prior to processing or to stall the data transfers. Accordingly, the computing device 100 may provide security without significant additional overhead for data streamed between processor 120 and accelerator device 136 as compared to existing, unsecured communications. Additionally, as described further below, the computing device 100 provides protection against certain denial of service (DoS) attacks.

The computing device 100 may be embodied as any type of device capable of performing the functions described herein. For example, the computing device 100 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 100 includes a processor 120, an I/O subsystem 124, a memory 130, and a data storage device 132. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122, which allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 130. The secure enclave support 122 may be embodied as a set of processor instruction extensions that allows the processor 120 to establish one or more secure enclaves in the memory 130. For example, the secure enclave support 122 may be embodied as Intel® Software Guard Extensions (SGX) technology.

The memory 130 may be embodied as any type of volatile or non-volatile memory or data storage capable of performing the functions described herein. In operation, the memory 130 may store various data and software used during operation of the computing device 100 such as operating systems, applications, programs, libraries, and drivers. As shown, the memory 130 may be communicatively coupled to the processor 120 via the I/O subsystem 124, which may be embodied as circuitry and/or components to facilitate input/output operations with the processor 120, the memory 130, and other components of the computing device 100. For example, the I/O subsystem 124 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations.

As shown, the I/O subsystem 124 includes a direct memory access (DMA) engine 126 and a memory-mapped I/O (MMIO) engine 128. The processor 120, including secure enclaves established with the secure enclave support 122, may communicate with the accelerator device 136 with one or more DMA transactions using the DMA engine 126 and/or with one or more MMIO transactions using the MMIO engine 128. As described further below, the transactions are cryptographically protected using corresponding security engines 138, 140 of the accelerator device 136. The computing device 102 may include multiple DMA engines 126 and/or MMIO engines 128 for handling DMA and MMIO transactions based on bandwidth between the processor 120 and the accelerator 136. Although illustrated as being included in the I/O subsystem 124, it should be understood that in some embodiments the DMA engine 126 and/or the MMIO engine 128 may be included in other components of the computing device 102 (e.g., the processor 120, memory controller, or system agent), or in some embodiments may be embodied as separate components. Thus, in some embodiments, the memory 130 may be directly coupled to the processor 120, for example via an integrated memory controller hub. Additionally, in some embodiments, the I/O subsystem 124 may form a portion of a system-on-a-chip (SoC) and be incorporated, along with the processor 120, the memory 130, the accelerator device 136, and/or other components of the computing device 100, on a single integrated circuit chip. Additionally or alternatively, in some embodiments the processor 120 may include an integrated memory controller and a system agent, which may be embodied as a logic block in which data traffic from processor cores and I/O devices converges before being sent to the memory 130.

The data storage device 132 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 134, which may be embodied as any communication circuit, device, or collection thereof, capable of enabling communications between the computing device 100 and other remote devices over a computer network (not shown). The communications subsystem 134 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The accelerator device 136 may be embodied as a field-programmable gate array (FPGA), an application-specific integrated circuit (ASIC), a coprocessor, or other digital logic device capable of performing accelerated functions (e.g., accelerated application functions, accelerated network functions, or other accelerated functions). Illustratively, the accelerator device 136 is an FPGA, which may be embodied as an integrated circuit including programmable digital logic resources that may be configured after manufacture. The FPGA may include, for example, a configurable array of logic blocks in communication over a configurable data interchange. The accelerator device 136 may be coupled to the processor 120 via a high-speed connection interface such as a peripheral bus (e.g., a PCI Express bus) or an inter-processor interconnect (e.g., an in-die interconnect (IDI) or QuickPath Interconect (QPI)), or via any other appropriate interconnect. The accelerator device 136 may receive data and/or commands for processing from the processor 120 and return results data to the processor 120 via DMA, MMIO, or other data transfers.

As shown, the accelerator device 136 includes the secure DMA engine 138 and the secure MMIO engine 140. As described further below, the security engines 138, 140 perform in-line authenticated cryptographic operations on data transferred between the processor 120 and the accelerator device 136. The accelerator device 136 may include multiple secure DMA engines 138 and/or secure MMIO engines 140 for handling DMA and MMIO transactions based on bandwidth between the processor 120 and the accelerator 136. Although illustrated as being included in the accelerator 136, it should be understood that in some embodiments the security engines 138, 140 may be included in other components of the computing device 100 (e.g., the processor 120 and/or the I/O subsystem 124), or in some embodiments may be embodied as separate components. Additionally or alternatively, although illustrated as being included in the accelerator 136, it should be understood that in some embodiments the processor 120 and/or SoC may also include hardware security engines (e.g., secure DMA engines and/or secure MMIO engine).

As shown, the computing device 100 may further include one or more peripheral devices 142. The peripheral devices 142 may include any number of additional input/output devices, interface devices, hardware accelerators, and/or other peripheral devices. For example, in some embodiments, the peripheral devices 142 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

Figure 2:
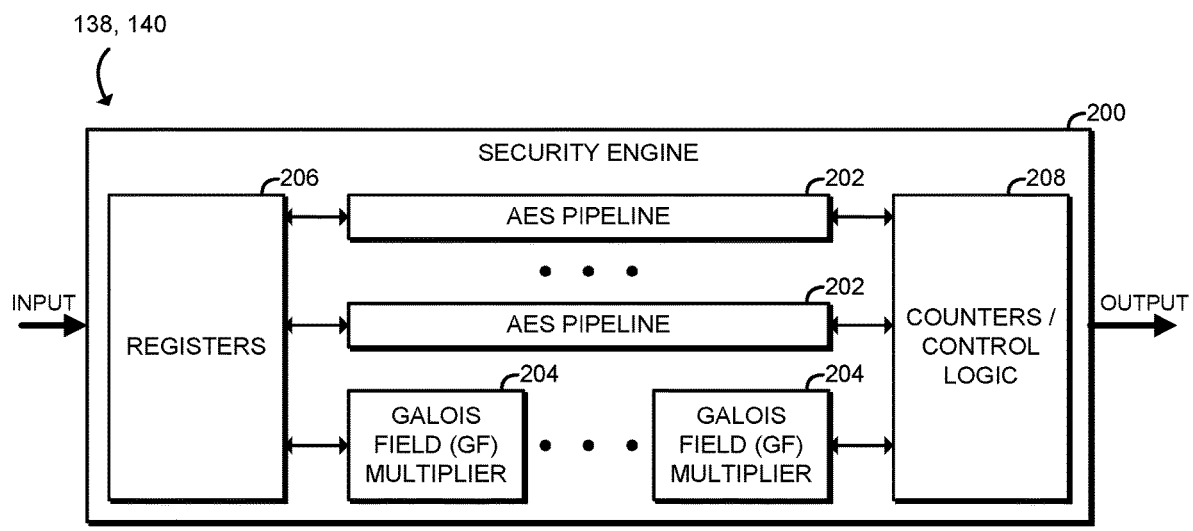
FIG. 2 is a simplified block diagram of at least one embodiment of a hardware security engine of the computing device of FIG. 1.

Referring now to FIG. 2, an illustrative embodiment of a security engine 200 (e.g., the secure DMA engine 138 or the secure MMIO engine 140) is shown. As shown, the security engine 200 includes multiple AES pipelines 202 and multiple Galois field (GF) multipliers 204. Each AES pipeline 202 may be embodied as digital logic resources that perform AES block cipher encryption. Illustratively, each AES pipeline 202 processes 128-bit blocks and thus includes ten pipeline stages, which correspond to ten AES rounds that are performed during AES encryption for 128-bit blocks. In other embodiments, each AES pipeline 202 may include a different number of pipeline stages, for example to process blocks of different sizes. Each GF multiplier 204 may be embodied as digital logic resources that performs multiplication in a Galois (finite) field of $2^{128}$ elements. Thus, the security engine 200 may perform cryptographic operations according to a Galois/Counter mode of operation (AES-GCM). As shown, the security engine 200 also includes registers 206 and counters/control logic 208. The security engine 200 receives input data and generates output data. The input data and output data may be embodied as blocks of binary data. The security engine 200 may also receive and/or assert other data signals, including additional authentication data, authentication tags, encryption keys, control signals, and/or other signals.

The particular number and/or arrangement of components of the security engine 200 may scale depending on the type of data transfer and/or the amount of data processed per transaction. For example, the number of parallel AES pipelines 202 and Galois Field multipliers 204 may be scaled to match the maximum bandwidth of the transfers and enable processing without buffers or throttling down transfer speed. For both DMA and MMIO, after the setup phase, the engines 138, 140 are ready for data transfer and the respective engine produces encrypted/decrypted output in the next clock cycle of a valid input; e.g., plaintext to ciphertext latency is 1 clock cycle and ciphertext to plaintext latency is 1 clock. The pipelines 202 are stalled if there is no valid input available. Otherwise, the security engine 200 continually streams out the encrypted/decrypted data in each clock cycle. For DMA, the secure DMA engine 138 may process 512 bits of data per transaction (e.g., per clock cycle), which may be embodied as four 128-bit blocks of data. In that example, the secure DMA engine 138 may include four AES pipelines 202 and five GF multipliers 204. When run at 256 MHz, this results in 128 Gbit/sec throughput. As another example, the secure MMIO engine 140 may process 32 or 64 bits of data per transaction (e.g., per clock cycle). In that example, the secure MMIO engine 140 may include two AES pipelines 202 and two GF multipliers 204.

Figure 3:
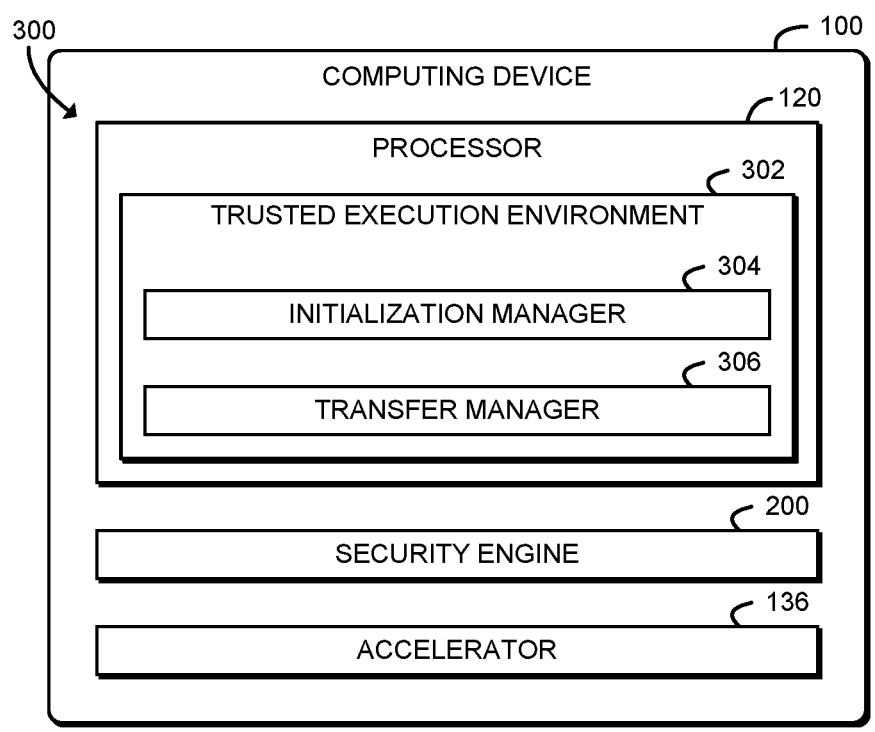
FIG. 3 is a simplified block diagram of at least one embodiment of an environment of the computing device of FIGS. 1-2.

Referring now to FIG. 3, in an illustrative embodiment, the computing device 100 establishes an environment 300 during operation. The illustrative environment 300 includes a trusted execution environment 302, an initialization manager 304, a transfer manager 306, and a security engine 200. The various components of the environment 300 may be embodied as hardware, firmware, software, or a combination thereof. As such, in some embodiments, one or more of the components of the environment 300 may be embodied as circuitry or collection of electrical devices (e.g., trusted execution environment circuitry 302, initialization manager circuitry 304, transfer manager circuitry 306, and/or security engine circuitry 200). It should be appreciated that, in such embodiments, one or more of the trusted execution environment circuitry 302, the initialization manager circuitry 304, the transfer manager circuitry 306, and/or the security engine circuitry 200 may form a portion of the processor 120, the I/O subsystem 124, the accelerator device 136, and/or other components of the computing device 100. Additionally, in some embodiments, one or more of the illustrative components may form a portion of another component and/or one or more of the illustrative components may be independent of one another.

The trusted execution environment 302 may be embodied as any trusted execution environment of the computing device 100 that is authenticated and protected from unauthorized access using hardware support of the computing device 100, such as the secure enclave support 122 of the processor 120. Illustratively, the trusted execution environment 302 is a secure enclave established using Intel SGX technology. As shown, the trusted execution environment 302 includes the initialization manager 302 and the transfer manager 306. In some embodiments, the initialization manager 302 and the transfer manager 306 may be included in separate trusted environments (e.g., separate enclaves).

The initialization manager 304 is configured to initialize the security engine 200 with an initialization vector and a secret key. The initialization vector and the secret key may be provided by the trusted execution environment 302. Initializing the security engine 200 may include asserting a start signal to the security engine 200 and inserting a zero block into a block cipher pipeline 202 in response to receiving the start signal. The zero block may be embodied as a 128-bit block with each bit equal to zero. Initializing the security engine 200 may further include deriving, by the security engine 200, one or more hash subkeys as a function of an output of the block cipher pipeline 202 in response to inserting the zero block. Initializing the security engine 200 may further include initializing an initial counter block as a function of the initialization vector in response to receiving the start signal, inserting a counter block based on the initial counter block into each of the block cipher pipelines 202, executing a predetermined number of block cipher rounds (e.g., ten rounds) with the block cipher pipelines 202 in response to inserting the counter blocks, and asserting a ready signal by the security engine 200 in response to executing the predetermined number of block cipher rounds.

The transfer manager 306 is configured to initiate a data transfer operation between the trusted execution environment 302 and an accelerator device 136 in response to initializing the security engine 200. In some embodiments, the data transfer operation may be a direct memory access (DMA) transfer with multiple input data blocks (DMA transactions). For DMA operations, the transfer manager 306 may be further configured to read, by the trusted execution environment 302, a final authentication tag value from the security engine 200, calculate, by the trusted execution environment 302, an expected authentication tag value for the data transfer operation, and compare, by the trusted execution environment 302, the final authentication tag value to the expected authentication tag value. In some embodiments, the data transfer operation may be a memory-mapped I/O (MMIO) transaction with a single input data block. For MMIO transactions, the transfer manager 306 may be further configured to calculate, by the trusted execution environment 302, an expected authentication tag value for the data transfer operation and to write, by the trusted execution environment 302, the expected authentication tag value to the security engine 200.

The security engine 200 is configured to perform an authenticated cryptographic operation for the data transfer operation in response to initiating the data transfer operation. The authenticated cryptographic operation may be embodied as an AES Galois/Counter mode (AES-GCM) cryptographic operation including authenticated encryption or authenticated decryption. For DMA operations, performing the authenticated cryptographic operation may include performing a cryptographic operation with the block cipher pipelines 202 on the input data blocks to generate a corresponding number of output data blocks. Performing the cryptographic operation may include reading the input data blocks, bitwise exclusive ORing each of the input data blocks with an output of a block cipher pipeline 202 to generate a corresponding output data block, and then inserting an incremented counter block into each of the block cipher pipelines 202. Performing the authenticated cryptographic operation may also include updating an intermediate authentication tag value register based on multiple ciphertext blocks (e.g, the input data blocks for decryption or the output data blocks for encryption). Updating the intermediate authentication tag value may include performing, for each ciphertext block, a Galois field multiplication with a GF multiplier 204 as a function of a hash subkey and the ciphertext block. The security engine 200 may be further configured to receive a last signal and to generate a final authentication tag value as a function of the intermediate authentication tag value register in response to receiving the last signal.

For MMIO operations, performing the authenticated cryptographic operation may include performing a cryptographic operation with a block cipher pipeline 202 on the input data block to generate an output data block and generating a final authentication tag value based on a ciphertext block (e.g., the input data block for decryption or the output data block for encryption). The security engine 200 may compare the final authentication tag value to an expected authentication tag value written by the trusted execution environment 302. Generating the final authentication tag value may include performing a Galois field multiplication with a GF multiplier 204 as a function of a hash subkey and the ciphertext block. Performing the cryptographic operation may include reading the input data block, bitwise exclusive ORing the input data block with an output of the block cipher pipeline 202 to generate the output data block, and inserting an incremented counter block into the block cipher pipeline 202 if the expected authentication tag value and the final authentication tag value match.

Figure 4:
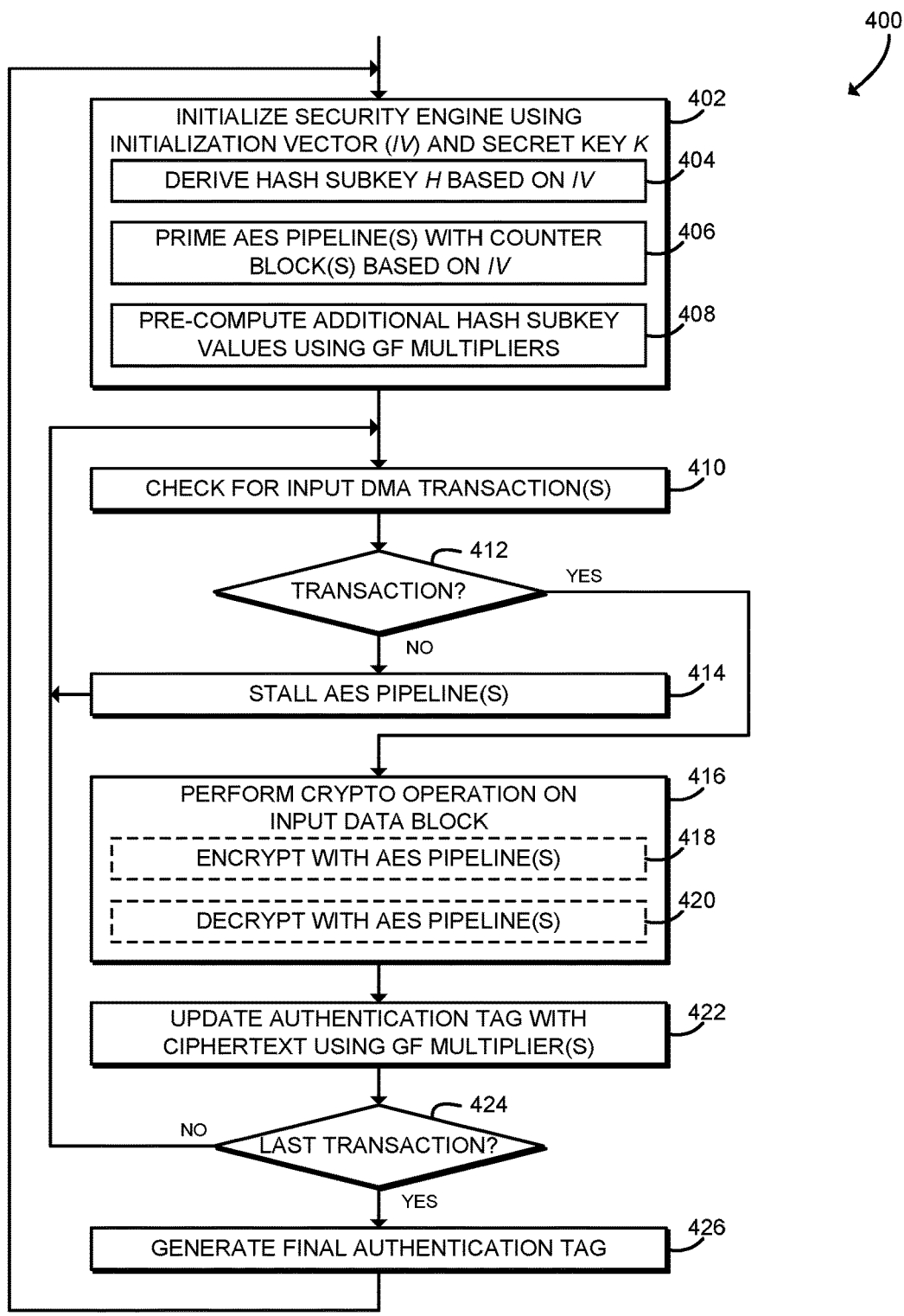
FIG. 4 is a simplified flow diagram of at least one embodiment of a method for low-latency cryptography for processor-accelerator communication that may be executed by the computing device of FIGS. 1-3.

Referring now to FIG. 4, in use, the computing device 100 may execute a method 400 for low-latency cryptography for processor-accelerator communication of DMA transfers. It should be appreciated that, in some embodiments, the operations of the method 400 may be performed by one or more components of the environment 300 of the computing device 100 as shown in FIG. 3. The method 400 begins in block 402, in which the computing device 100 initializes the security engine 200 (e.g., the secure DMA engine 138) using an initialization vector IV and a secret key K. The IV is a nonce value associated with a particular DMA transfer, which may include multiple DMA transactions. The security engine 200 may be initialized, for example, in response to a signal from the processor 120 caused by the trusted execution environment 302. One potential embodiment of a method for initializing and managing DMA transfers that may be performed by the trusted execution environment 302 is described below in connection with FIG. 5.

The value for IV may be determined according to one or more AES-GCM specifications. The secret key K may be embodied as any symmetric encryption key used to protect data transferred between the processor 120 and the accelerator 136. During initialization, the security engine 200 pre-computes values, primes encryption pipelines, and otherwise prepares to process data transfers. As described further, initializing the security engine 200 may hide pipeline latency or other latency associated with the security engine 200. For example, initialization may require 16 clock cycles for DMA. In block 404, the security engine 200 derives a hash subkey H based on IV. The hash subkey H is determined according to one or more AES-GCM specifications, illustratively by encrypting a block with all bits set to zero using the secret key K. In block 406, the security engine 200 primes one or more AES pipelines 202 with counter blocks based on IV. The initial counter block value CTR may be determined according to one or more AES-GCM specifications. For multiple AES pipelines 202, an incremented counter block (e.g., CTR+1, CTR+2, etc.) may be inserted into each of AES pipeline. In block 408, the security engine 200 pre-computes additional hash subkey values using one or more GF multipliers 204. For example, the security engine 200 may compute $H^2=H \cdot H$, $H^3=H \cdot H \cdot H$, and so on, where the symbol · denotes Galois field multiplication.

In block 410, the security engine 200 checks for an input DMA transaction. For example, the DMA transaction may be embodied as 512 bits of data (e.g., four 128-bit blocks of data). As described further below, a DMA transfer of data (e.g., a contiguous block of data or other data) may include multiple DMA transactions. In block 412, the security engine 200 determines whether an input DMA transaction has been received. If so, the method 400 branches to block 416, described below. If an input DMA transaction was not received, the method 400 branches to block 414, in which the security engine 200 stalls the AES pipelines 202. When the AES pipelines 202 are stalled, they retain their state and are prepared to output encrypted values on the next clock cycle. After stalling the AES pipelines 202, the method 400 loops back to block 410 to continue waiting for input DMA transactions.

Referring back to block 412, if a DMA transaction was received, the method 400 branches to block 416, in which the security engine 200 performs a cryptographic operation on the input data block associated with the DMA transaction. In some embodiments, in block 418 the security engine 200 may encrypt the input data using the AES pipelines 202. For example, the security engine 200 may encrypt plaintext data received from the accelerator 136 before it is transferred with a DMA transaction to the processor 120. In some embodiments, in block 420 the security engine 200 may decrypt the input data using the AES pipelines 202. For example, the security engine 200 may decrypt ciphertext data received from the processor 120 before it is transferred with a DMA transaction to the accelerator 136.

In block 422, the security engine 200 updates an authentication tag (AT) with the ciphertext block(s) using multiple GF multipliers 204. The ciphertext blocks may be the input data to the security engine 200 (e.g., for decryption operations) or the output data from the security engine 200 (e.g., for encryption operations). The AT may be updated based on the ciphertext and one or more other values (e.g., hash subkeys H, $H^2$, $H^3$, additional authenticated information A, etc.).

In block 424, the security engine 200 determines whether a last DMA transaction associated with the DMA transfer has been processed. As described above, a particular DMA transfer of data may include multiple DMA transactions (e.g., multiple DMA transactions of 512-bit data blocks). The trusted execution environment 302 or other entity may assert a last signal to the security engine 200 or otherwise indicate to the security engine 200 that the DMA transfer is complete. If the last DMA transaction has not been processed, the method 400 loops back to block 410, in which the security engine 200 waits for additional DMA transactions. Note that the security engine 200 is not re-initialized between DMA transactions. Referring back to block 424, if the last DMA transaction has been processed, the method 400 advances to block 426. In block 426 the security engine 200 generates a final authentication tag T based on the intermediate value of T updated after each DMA transaction. As described further below, the final authentication tag T may be used by the processor 120 and/or the accelerator 136 to verify that a data transfer was authentic and unaltered. After generating the final authentication tag, the method 400 loops back to block 402 to re-initialize the security engine 200 to process additional DMA transfers.

Figure 5:
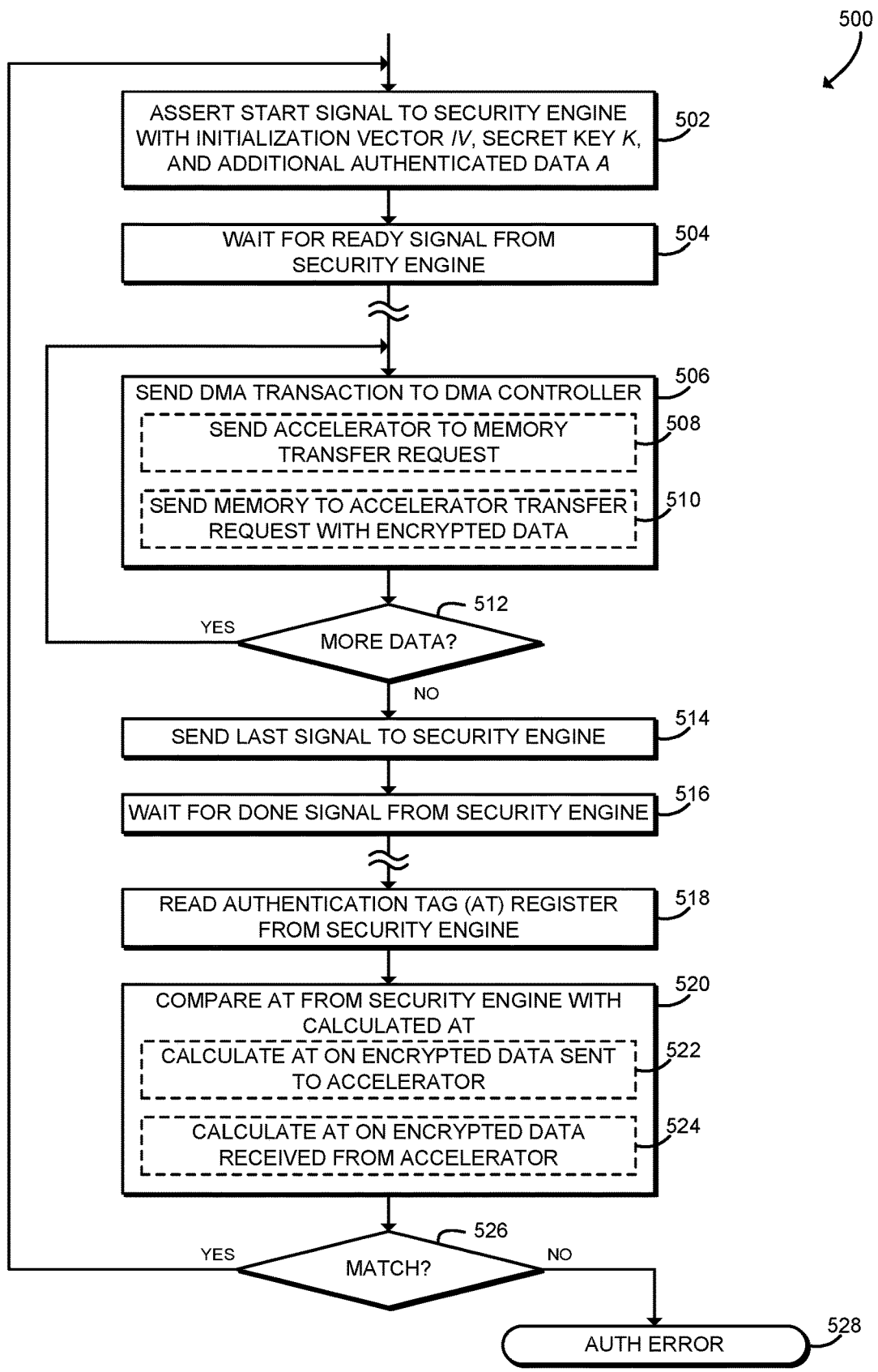
FIG. 5 is a simplified flow diagram of at least one embodiment of a method for direct memory access (DMA) transfer management that may be executed by the computing device of FIGS. 1-3.

Referring now to FIG. 5, in use, the computing device 100 may execute a method 500 for DMA transfer management. It should be appreciated that, in some embodiments, the operations of the method 500 may be performed by one or more components of the environment 300 of the computing device 100 as shown in FIG. 3, such as the trusted execution environment 302. The method 500 begins in block 502, in which the processor 120 asserts a start signal to the secure DMA engine 138. The computing device 100 provides the initialization vector IV, secret key K, and additional authenticated data A to the secure DMA engine 138. The computing device 100 may use any technique to security communicate that data to the secure DMA engine 138. As described above, IV is a nonce value associated with a DMA transfer, and may be determined according to one or more AES-GCM specifications. The secret key K may be embodied as any symmetric encryption key used to protect data transferred between the processor 120 and the accelerator 136. The key K may be protected from unauthorized disclosure by the trusted execution environment 302, for example by being maintained in a secure enclave established using the secure enclave support 122 of the processor 120. The additional authenticated data A may be embodied as any addressing data, metadata, or other data related to the DMA transfer that will be authenticated but not encrypted by the security engine 200. In response to the start signal, the secure DMA engine 138 performs an initialization process as described above in connection with block 402 of FIG. 4. One potential embodiment of a method for initialization is described below in connection with FIG. 6.

In block 504, the processor 120 waits for a ready for data signal to be asserted by the secure DMA engine 138. As described further below, the ready for data signal is asserted when the secure DMA engine 138 completes its initialization process. The computing device 100 may poll, wait for an interrupt, or otherwise monitor for the ready for data signal. After the ready for data signal is asserted, the method 500 proceeds to block 506.

In block 506, the processor 120 configures a DMA controller to perform a DMA transfer. The processor 120 may configure the DMA controller, for example, by writing one or more descriptors or other commands that describe the DMA transfer. The descriptors may identify a memory address, memory range, scatter-gather list of addresses or ranges, or other locations in memory and a direction of transfer (e.g., from the memory 130 to the accelerator 136 or vice versa). The DMA controller may perform the DMA transfer, for example, by performing one or more DMA transactions defined by the descriptors. Each DMA transaction may transfer a fixed block of data, such as a 512-bit block of data. The DMA controller may interrupt or otherwise signal the processor 120 when the DMA transfer is completed and/or when each DMA transaction is completed. Illustratively, the DMA controller may included or otherwise be coupled with the DMA engine 126. In some embodiments, the DMA controller may be included in the accelerator 136 or other component of the computing device. In block 508, the processor 120 may send a request that data be transferred from the accelerator 136 into a location in the memory 130. In block 510, the processor 120 may send a request that encrypted data be transferred from the memory 130 to the accelerator 136. As described further below in connection with FIGS. 7-8, the secure DMA engine 138 performs authenticated cryptographic operations on the data as the DMA transactions are performed (e.g., as the data is transferred between the memory 130 and the accelerator 136). Although illustrated as being configured by the processor 120, it should be understood that in other embodiments the DMA controller may be configured by a different entity, such as the accelerator 136.

In block 512, the processor 120 determines whether additional data remains to be transferred by DMA. For example, the processor 120 may determine whether the DMA controller has completed all of the DMA transactions associated with the DMA transfer. If additional data remains, the method 500 loops back to block 506 to continue transferring data. If no additional data remains, the method 500 advances to block 514.

In block 514, the processor 120 sends a last signal to the secure DMA engine 138. As described further below in connection with FIGS. 7-8, the secure DMA engine 138 calculates the final authentication tag value T in response to the last signal. Although illustrated as asserting the last signal after completing the DMA transfer, in some embodiments the last signal may be asserted with the last DMA transaction or otherwise at the end of processing the DMA transaction. In block 516, the processor 120 waits for a done signal asserted by the secure DMA engine 138. As described further below, the done signal is asserted when the secure DMA engine 138 completes calculating the final authentication tag T. The processor 120 may poll, wait for an interrupt, or otherwise monitor for the done signal. After the done signal is asserted, the method 500 proceeds to block 518.

In block 518, the processor 120 reads the final (AT) value T from a register of the secure DMA engine 138. In block 520, the processor 120 compares the AT value T to an expected AT value calculated by the processor 120, for example by the trusted execution environment 302. In some embodiments, in block 522, the processor 120 may calculate the expected AT based on encrypted data (ciphertext) that was sent to the accelerator 136. For example, the expected AT may be calculated based on ciphertext sent to the accelerator 136 with one or more DMA transactions. In some embodiments, in block 524, the processor 120 may calculate the expected AT based on encrypted data received from the accelerator 136, for example with one or more DMA transactions.

In block 526, the processor 120 determines whether the AT value T read from the secure DMA engine 138 matches the expected AT value calculated by the processor 120. A mismatch indicates that an authentication failure has occurred. For example, the ciphertext may have been altered, a malicious actor may have configured false descriptor or other DMA transaction request, or another error may have occurred. If the values do not match, the method 500 branches to block 528, in which the processor 120 indicates an authentication error. Referring back to block 526, if the AT values match, then the method 500 loops back to block 502, in which the secure DMA engine 138 may be re-initialized for additional DMA transfers.

Figure 6:
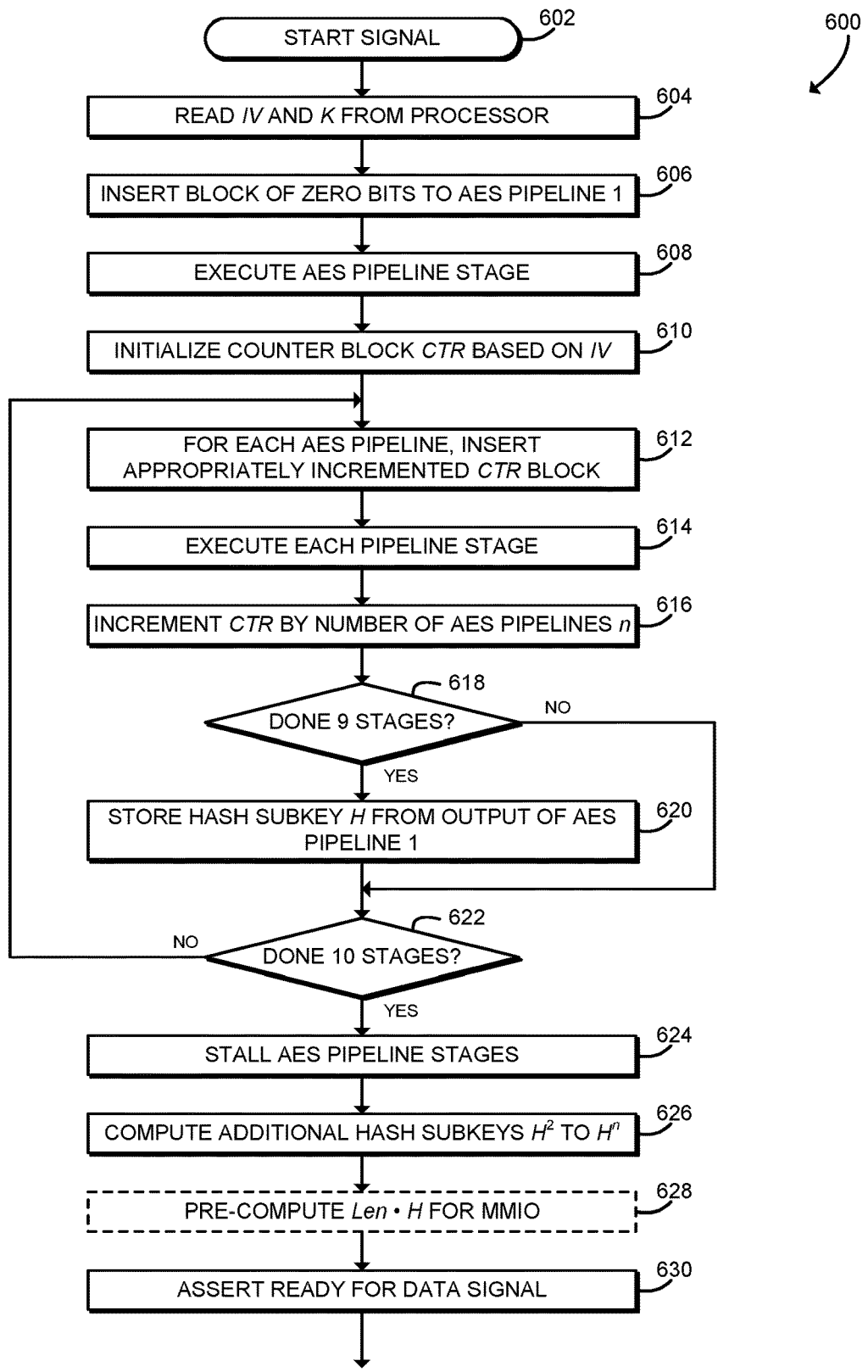
FIG. 6 is a simplified flow diagram of at least one embodiment of a method for engine initialization that may be executed by the hardware security engine of the computing device of FIGS. 1-3.

Referring now to FIG. 6, in use, the computing device 100 may execute a method 600 for security engine 200 initialization. It should be appreciated that, in some embodiments, the operations of the method 600 may be performed by one or more components of the environment 300 of the computing device 100 as shown in FIG. 3, such as the security engine 200. The method 600 begins in block 602, in which the security engine 200 receives a start signal, for example from the trusted execution environment 302. After receiving the start signal, the method 600 advances to block 604.

In block 604, the security engine 200 reads the initialization vector IV and the secret key K from the processor 120. As described above, IV is a nonce value associated with multiple transactions, such as a DMA transfer session or a block of MMIO transactions, and may be determined according to one or more AES-GCM specifications. The secret key K may be embodied as any symmetric encryption key used to protect data transferred between the processor 120 and the accelerator 136.

In block 606, the security engine 200 inserts a block which each bit set to zero (e.g., a 128-bit block of all zeros) to an AES pipeline 202, identified as pipeline 1. Although illustrated as inserting a zero block, it should be understood that in other embodiments, any predetermined constant or otherwise known value may be inserted. In block 608, the security engine 200 executes a pipeline stage of the AES pipeline 202 (pipeline 1). Executing the pipeline stage calculates an AES round and prepares the AES pipeline 202 for insertion of another value to be encrypted. Executing the pipeline stage may require one clock cycle.

In block 610, the security engine 200 initializes a counter block CTR based on IV. The counter block may be determined according to one or more AES-GCM specifications. Illustratively, the security engine 200 initializes a 32-bit counter with the decimal value "2" and forms CTR as a 128-bit value equal to IV concatenated with the 32-bit counter, as shown in Equation 1, below.

$$CTR = IV \| (2d^{32}) \tag{1}$$

In block 612, for each AES pipeline 202, the security engine 200 inserts an appropriately incremented CTR block into the corresponding AES pipeline 202. For example, in an embodiment with four AES pipelines 202a, 202b, 202c, 202d, the security engine 200 may insert counter blocks CTR, CTR+1, CTR+2, and CTR+3, respectively. The CTR blocks may be incremented according to one or more AES-GCM standards, for example by incrementing the 32-bit counter value and concatenating IV with that incremented counter value. As another example, and as described further below in connection with FIGS. 9-11, in an embodiment with two AES pipelines 202a, 202b, the security engine 200 may insert counter block CTR into pipeline 202a and may insert a pre-counter block based on IV and used for authentication tag generation into pipeline 202b. In block 614, the security engine 200 executes a pipeline stage of each AES pipeline 202. As described above, executing the pipeline stage calculates an AES round and prepares the AES pipeline 202 for insertion of another value to be encrypted. Executing the pipeline stage may require one clock cycle. In block 616, the security engine 200 increments the counter block CLK by the number of AES pipelines n. For example, in an embodiment with four AES pipelines 202, the security engine 200 may increment the counter block to equal CTR+4. As discussed above, the security engine 200 may increment the 32-bit counter by n and then concatenate IV with that incremented counter value. As another example, in embodiment with two pipelines 202a, 202b, wherein pipeline 202b is used for authentication tag generation, the security engine 200 may increment the counter by one and determine a corresponding pre-counter block.

In block 618, the security engine 200 determines whether nine pipeline stages (clock cycles) have been executed since inserting the counter blocks based on CTR. For example, the security engine 200 may determine whether the 32-bit counter equals 34. If not, the method 600 branches ahead to block 622. If nine pipeline stages have been executed, the method 600 advances to block 620. In block 620, the security engine 200 stores the hash subkey H from the output of the corresponding AES pipeline 202 (pipeline 1). The hash subkey H is determined by encrypting a 128-bit block with each bit set to zero using the secret key K, as shown in Equation 2 below. Because the zero block was inserted before inserting counter blocks based on CTR, the corresponding AES pipeline 202 has executed ten stages (AES rounds), and thus the output of the corresponding AES pipeline 202 is H, the encrypted zero block. H may be stored in a register 206 of the security engine 200.

$$H=CIPH_K(0^{128}) \qquad (2)$$

In block 622, the security engine 200 determines whether ten pipeline stages (clock cycles) have been executed since inserting the counter blocks based on CTR. For example, the security engine 200 may determine whether the 32-bit counter equals 38. If not, the method 600 loops back to block 612 to continue inserting counter blocks into the pipelines 202. If ten pipeline stages have been executed, the method 600 advances to block 624.

In block 624, the security engine 200 stalls all of the AES pipeline stages. As discussed above, when the AES pipelines 202 are stalled, they retain their state and are prepared to output encrypted values on the next clock cycle. Thus, after initialization, the AES pipelines 202 may be primed with appropriate counter blocks to perform cryptographic operations.

In block 626, the security engine 200 computes additional hash subkeys $H^2$ to $H^n$, where n is the number of AES pipelines and $H^n$ is the nth power of H under the product "·" (Galois field multiplication). The subkeys $H^2$ to $H^n$ may be calculated with multiple GF multipliers 204 of the security engine in parallel. For example, in an embodiment with four AES pipelines 202, the security engine 200 may calculate $H^2$ in one clock cycle and then calculate $H^3$ and $H^4$ in the next clock cycle. The pre-computed values of $H^2$ to $H^n$ may be stored in registers 206 of the security engine 200.

In some embodiments, in block 628 the security engine 200 may pre-compute a value Len·H using a GF multiplier 204. The value Len is determined based on the length of the additional authenticated data A and the ciphertext C, for example equal to len(A)∥len(C). For MMIO transactions, the lengths of A and C may be constant and known ahead of time, and thus the value Len·H. Illustratively, for MMIO transactions, A may have a length of 128 bits and C may have a length of 64 bits.

In block 630, the security engine 200 asserts a ready for data signal to the processor 120. As described above, after asserting the ready for data signal, the processor 120 may initiate one or more data transactions between the processor 120 and the accelerator 136, such as DMA transactions and/or MMIO transactions. After asserting the ready for data signal, the security engine 200 waits for input data or other signals from the processor 120. One potential embodiment of a method for processing DMA transactions that may be executed by the security engine 200 (e.g., by a secure DMA engine 138) is described further below in connection with FIGS. 7 and 8. One potential embodiment of a method for processing MMIO transactions that may be executed by the security engine 200 (e.g., by a secure MMIO engine 140) is described further below in connection with FIG. 11.

Figure 7:
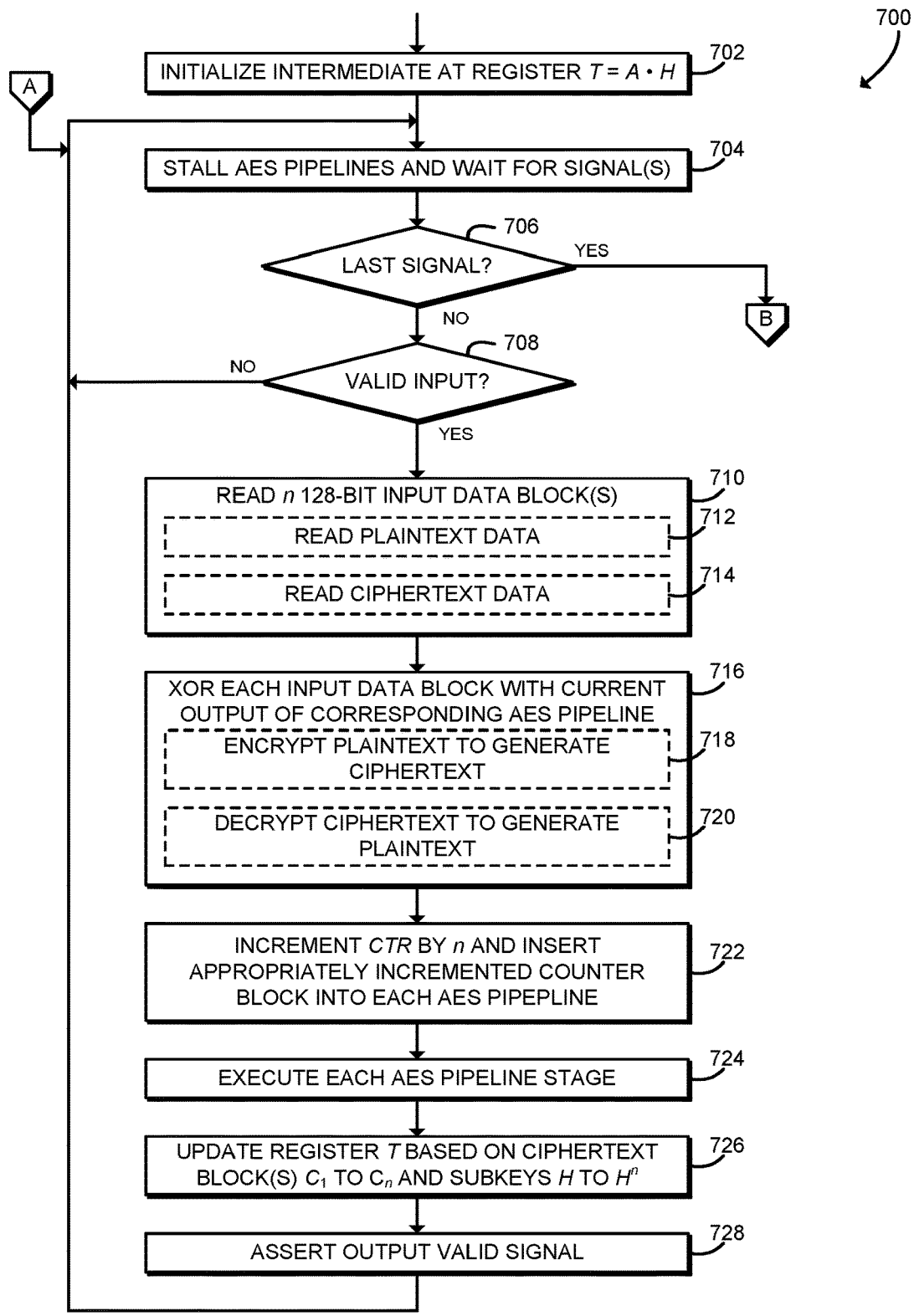
FIGS. 7-8 are a simplified flow diagram of at least one embodiment of a method for DMA transfers may be executed by the hardware security engine of the computing device of FIGS. 1-3.
Figure 8:
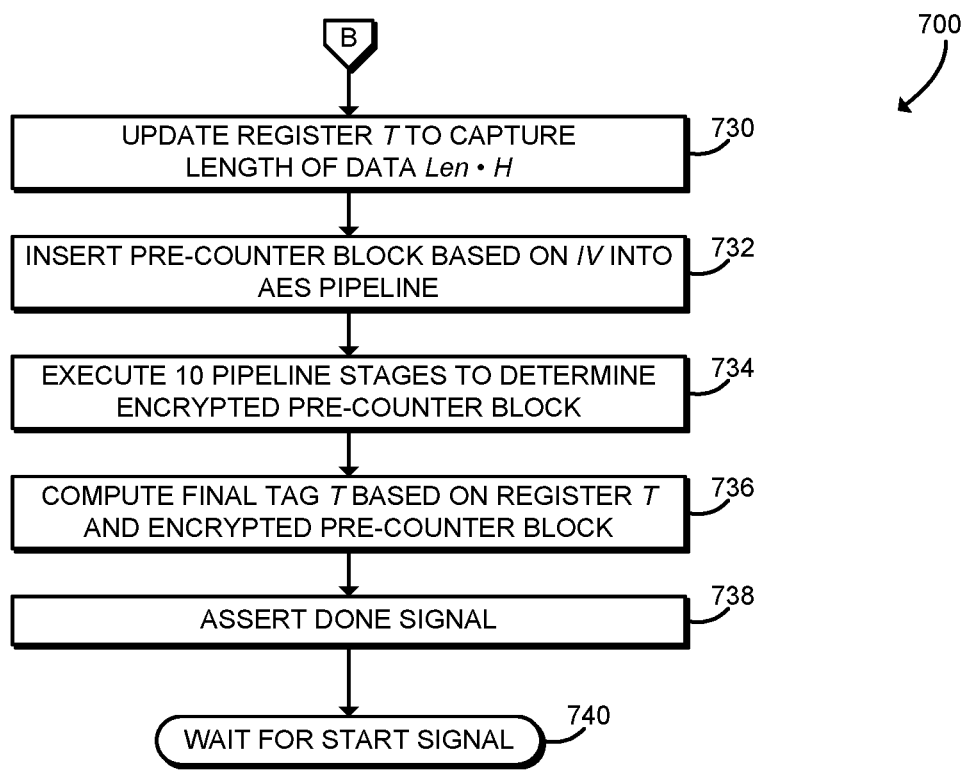

Referring now to FIGS. 7 and 8, in use, the secure DMA engine 138 of the computing device 100 may execute a method 700 for performing secure DMA transfers. It should be appreciated that, in some embodiments, the operations of the method 700 may be performed by one or more components of the environment 300 of the computing device 100 as shown in FIG. 3, such as the security engine 200 (e.g., the secure DMA engine 138). The method 700 begins in block 702, in which the secure DMA engine 138 initializes an intermediate authentication tag (AT) register T as equal to A·H, where the symbol "·" denotes Galois field multiplication. The register T may be initialized during or after initialization of the secure DMA engine 138 as described above in connection with FIG. 6. As described further below, the AT value is be determined according to one or more AES-GCM specifications. The register T may be stored in the registers 206 of the secure DMA engine 138. After initializing T, the method 700 advances to block 704.

In block 704, the secure DMA engine 138 stalls the AES pipelines 202 and waits for one or more signals to be asserted from the processor 120. As described above, stalling the AES pipelines 202 allows the pipelines to retain their state and be prepared to output encrypted values on the next clock cycle. In block 706, the secure DMA engine 138 determines whether a last signal has been asserted. As described above, the processor 120 asserts the last signal to indicate that the DMA transfer is complete and no additional DMA transactions remain. If the last signal is asserted, the method 700 branches to block 730, shown in FIG. 8 and described further below. If the last signal is not asserted, the method 700 advances to block 708. In block 708, the secure DMA engine 138 determines whether there is a valid input to process (e.g., whether an input valid signal has been asserted by the processor 120). If not, the method 700 loops back to block 704 to continue to stall the AES pipelines 202 and wait for signals. If valid input exists, the method 700 advances to block 710.

In block 710, the secure DMA engine 138 reads n 128-bit input data blocks. In the illustrative embodiment, the secure DMA engine 138 reads four (4) 128-bit input data blocks, which results in 512 bits of DMA data per transaction. The input data blocks may be read from the memory 130 (e.g., for transfers from the memory 130 to the accelerator 136) or from the accelerator 136 (e.g., for transfers from the accelerator 136 to the memory 130). In some embodiments, in block 712 the secure DMA engine 138 may read plaintext data (i.e., for an encryption operation). In some embodiments, in block 714 the secure DMA engine 138 may read ciphertext data (i.e., for a decryption operation).

In block 716, the secure DMA engine 138 bitwise exclusive ORs (XOR, or the symbol ⊕) each input data block with the current output of a corresponding AES pipeline 202. For example, in the illustrative embodiment with four AES pipelines 202a, 202b, 202c, 202d and four input data blocks $X_1$, $X_2$, $X_3$, $X_4$, the secure DMA engine 138 determines $X_1 \oplus 202a$, $X_2 \oplus 202b$, $X_3 \oplus 202c$, and $X_4 \oplus 202d$. XORing the output of the pipelines 202 with the input data blocks performs a cryptographic operation on the input data blocks. Thus, the secure DMA engine 138 may read the input data in one clock cycle and generate the output data in the following clock cycle. In some embodiments, in block 718 the secure DMA engine 138 encrypts plaintext input data blocks P to generate corresponding ciphertext blocks C. For example, in the illustrative embodiment the secure DMA engine 138 calculates $C_1=P_1 \oplus 202a$, $C_2=P_2 \oplus 202b$, $C_3=P_3 \oplus 202c$, $C_4=P_4 \oplus 202d$. In some embodiments, in block 720 the secure DMA engine 138 decrypts ciphertext input data blocks C to generate corresponding plaintext blocks P. For example, in the illustrative embodiment the DMA engine calculates $P_1=C_1 \oplus 202a$, $P_2=C_2 \oplus 202b$, $P_3=C_3 \oplus 202c$, $P_4=C_4 \oplus 202d$. As shown, the outputs of the AES pipelines 202 may be used for both encryption and decryption operations.

In block 722, the secure DMA engine 138 increments CTR by n and inserts appropriately incremented counter blocks into each AES pipeline 202. For example, in the illustrative embodiment with four AES pipelines 202, the security engine 200 may increment the counter block to equal CTR+4 by incrementing a 32-bit counter by n and then concatenating IV with that incremented counter value. After incrementing CTR, the secure DMA engine 138 may insert counter blocks CTR, CTR+1, CTR+2, and CTR+3 into the AES pipelines 202a, 202b, 202c, 202d, respectively. In block 724, the secure DMA engine 138 executes a pipeline stage of each AES pipeline 202. As described above, executing the pipeline stage calculates an AES round and prepares the AES pipeline 202 for insertion of another value to be encrypted. Executing the pipeline stage may require one clock cycle.

In block 726, the secure DMA engine 138 updates the intermediate AT register T based on the ciphertext blocks $C_1$ to $C_n$ and the subkeys H to H''. As described above, the subkeys H to H'' are pre-computed during initialization, and the ciphertext blocks C may be the input to the secure DMA engine 138 (for decryption) or the output of the secure DMA engine 138 (for encryption). The register T may be updated according to one or more AES-GCM specifications. In particular, the updated value for T may be determined according to Equation 3, below. The Galois field multiplication operations of Equation 3 may be performed in parallel by multiple GF multipliers 204 of the secure DMA engine 138. Thus, in the illustrative embodiment, the secure DMA engine 138 may include five GF multipliers 204 that perform the five GF multiplications in one clock cycle. Thus, for 128-bit ciphertext blocks, the secure DMA engine 138 may update the authentication tag with a bandwidth of 512 bits per clock cycle. In some embodiments, authentication-tag related operations may be performed in parallel with ciphertext/plaintext generation.

$$T'=T \cdot H^4 \oplus C_1 \cdot H^4 \oplus C_2 \cdot H^3 \oplus C_3 \cdot H^2 \oplus C_4 \cdot H \quad (3)$$

After updating the register T, in block 728 the secure DMA engine 138 asserts an output valid signal. In response to asserting the output valid signal, the DMA transaction may be performed with the output data of the secure DMA engine 138. For example, for a decryption operation, decrypted output data may be transferred to the accelerator 136. As another example, for an encryption operation, encrypted output data may be stored in the memory 130, where it may be accessed by the processor 120. Performance overhead experienced on the data transfer may be limited to two clock cycle latency because the AES pipelines 202 are pre-filled before starting the data stream, which is thus not experienced as latency, and the throughput of the secure DMA engine 138 is capable of processing the full bandwidth of communication (512 bits per DMA transfer). After performing the DMA transaction, the method 700 loops back to block 704 to stall the AES pipelines 202 and wait for additional signals.

Referring back to block 706, if the secure DMA engine 138 determines that the last signal is asserted, the method 700 branches to block 730, shown in FIG. 8. In block 730, the secure DMA engine 138 captures length data in the intermediate AT register T. The register T may be updated according to one or more AES-GCM specifications. In particular, the updated value for T may be determined according to Equation 4, below. Len may be determined as len(A)∥len(C), that is, the length of the additional authenticated data concatenated with the length of the ciphertext. The operations of Equation 4 may be performed with two GF multipliers 204 in parallel, and may require 2 clock cycles.

$$T'=T \cdot H^4 \oplus \text{Len} \cdot H \quad (4)$$

In block 732, the secure DMA engine 138 inserts a pre-counter block based on IV into an AES pipeline 202. The pre-counter block may be determined according to one or more AES-GCM specifications. For example, the pre-counter block may be determined as IV∥($1d^{t32}$), that is, IV concatenated with a 32-bit counter value equal to decimal 1. To reduce latency, the pre-counter block may be inserted into the AES pipeline 202 in parallel with the GF multiplication operations of block 730. In block 734, the secure DMA engine 138 executes ten pipeline stages of the AES pipeline 202 to produce an encrypted pre-counter block. Executing the ten pipeline stages may require 10 clock cycles.

After waiting for execution of the pipeline stages, in block 736 the secure DMA engine 138 computes the final AT T based on the intermediate AT value in the register T and the encrypted pre-counter block. The final AT T may be determined according to one or more AES-GCM specifications. In particular, the final AT T may be determined according to Equation 5, below. Thus, calculation of the final AT T, including the operations of Equations 4 and 5 may involve two GF multiplications, one AES encryption, and two XOR operations. By starting the AES encryption in parallel with the GF multiplication, calculation of the final AT T may require eleven (11) clock cycles.

$$T'=T \oplus CIPH_K(IV\|1d^{t32}) \quad (5)$$

In block 738, the secure DMA engine 138 asserts a done signal or other signal indicating the final AT T has been computed. For example, in some embodiments, the secure DMA engine 138 may assert a predone pulse, release the final tag T, and then generate a done pulse. After asserting the done signal, the trusted execution environment 302 may verify the final authentication tag T to verify that the DMA transaction was authentic and not tampered with or otherwise altered. The processor 120 and/or the accelerator 136 may perform one or more processing operations on the transferred data. After asserting the done signal, the method 700 advances to block 740, in which the secure DMA engine 138 waits for a start signal from the processor 120. Upon receiving the start signal, the DMA engine 138 may be reinitialized as described above in connection with FIG. 6 and then may perform another DMA transfer.

As described above, the register T may be updated after each DMA transaction within a larger DMA transfer. In some embodiments, the processor 120 may read the register T at any time and compare that value to a corresponding value calculated by the processor 120 (e.g., by the trusted execution environment 302) on the data transferred up to that time. Thus, the processor 120 may validate that the data was transferred with integrity as an intermediate validity check to provide an early warning of an integrity failure. In the case of an intermediate validity failure, the processor 120 may avoid transferring the remaining data and let the monitor (e.g., the trusted execution environment 302) perform remedial actions earlier. For example, the intermediate checks may be performed after completion of data transfer of a DMA descriptor. Or, the intermediate checks may be performed as the processor 120 switches from one buffer to another when using a ping-pong buffer scheme to transfer data.

In the ping-pong buffer scheme, instead of allocating a buffer of the full size of the DMA transfer, the computing device 100 may allocate two buffers (A and B) to transfer in "installments" and coordinate when the sender can overwrite a buffer with the receiver. For example, the sender may fill buffer A and tell the receiver that data in A is ready for reading. The sender may continue to fill B, tell the receiver that buffer B is available, and then check or wait for the receiver to free A. The receiver reads A and when finished tells the sender that A is now available for overwrite. The receiver waits for the sender to tell that there is a new buffer ready (e.g., buffer B). The Sender writes the remaining data to A and so on, which the sender and receiver continuing to ping-pong between buffers A and B until all data has been sent and received.

Figure 9:
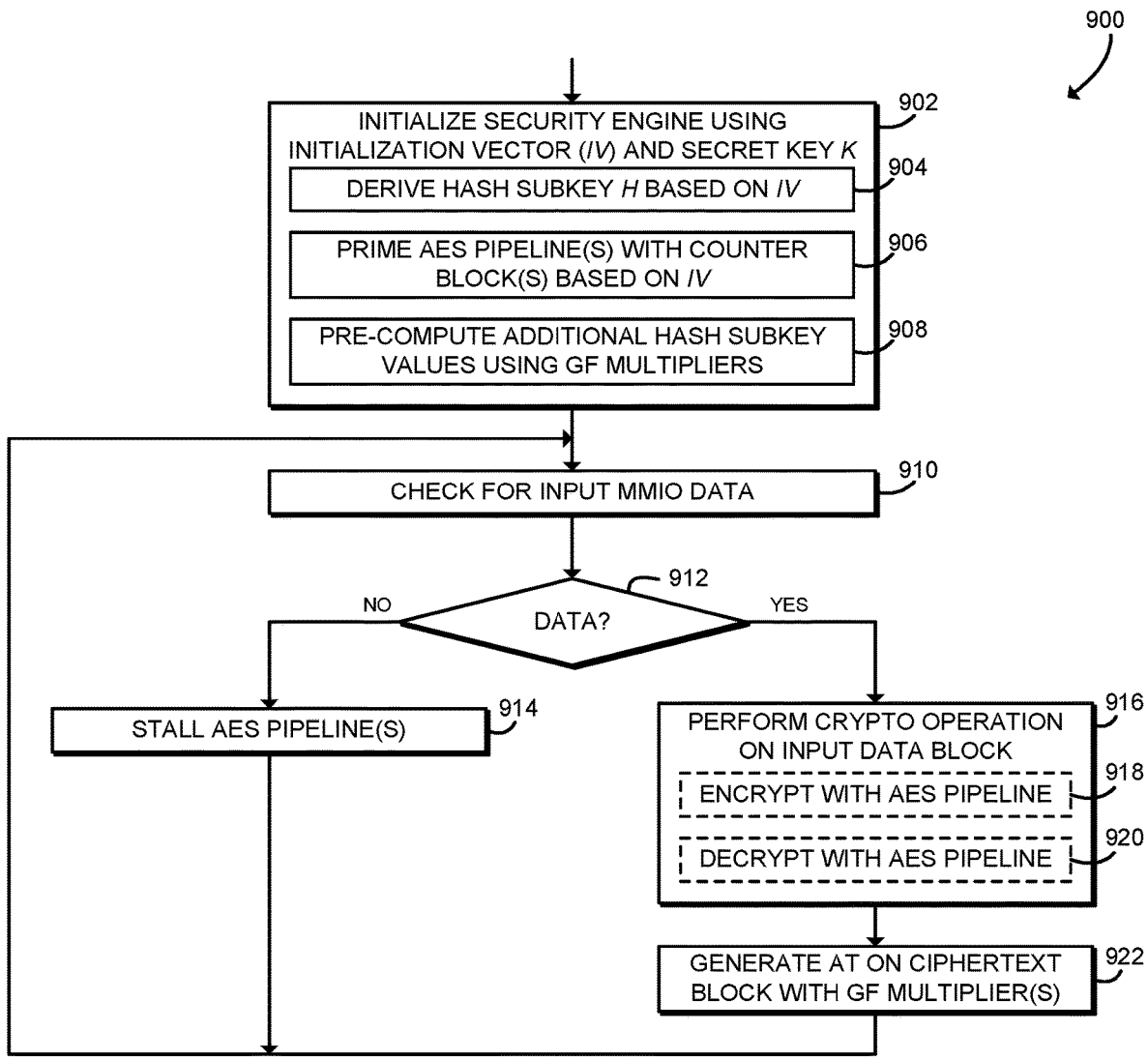
FIG. 9 is a simplified flow diagram of at least one embodiment of a method for low-latency cryptography for processor-accelerator communication that may be executed by the computing device of FIGS. 1-3.

Referring now to FIG. 9, in use, the computing device 100 may execute a method 900 for low-latency cryptography for processor-accelerator communication for a block of MMIO transactions. It should be appreciated that, in some embodiments, the operations of the method 900 may be performed by one or more components of the environment 300 of the computing device 100 as shown in FIG. 3. The method 900 begins in block 902, in which the computing device 100 initializes the security engine 200 (e.g., a secure MMIO engine 140) using an initialization vector IV and a secret key K. The IV is a nonce value associated with a particular block of MMIO transactions. The security engine 200 may be initialized, for example, in response to a signal from the processor 120 caused by the trusted execution environment 302. One potential embodiment of a method for initializing and managing a block of MMIO transactions that may be performed by the trusted execution environment 302 is described below in connection with FIG. 10.

The value for IV may be determined according to one or more AES-GCM specifications. The secret key K may be embodied as any symmetric encryption key used to protect data transferred between the processor 120 and the accelerator 136. During initialization, the security engine 200 pre-computes values, primes encryption pipelines, and otherwise prepares to process data transfers. As described further, initializing the security engine 200 may hide pipeline latency or other latency associated with the security engine 200. Initialization may require 14 clock cycles for MMIO. In block 904, the security engine 200 derives a hash subkey H based on IV. The hash subkey H is determined according to one or more AES-GCM specifications, illustratively by encrypting a block with all bits set to zero using the secret key K. In block 906, the security engine 200 primes one or more AES pipelines 202 with counter blocks based on IV. The initial counter block value CTR may be determined according to one or more AES-GCM specifications. In particular, the security engine 200 may prime one AES pipeline 202 with the initial counter block value CTR and prime another AES pipeline 202 with a pre-counter block (e.g., CTR−1) used for authentication tag generation. In block 408, the security engine 200 pre-computes additional hash subkey values using one or more GF multipliers 204. For example, the security engine 200 may compute $H^2 = H \cdot H$, $H^3 = H \cdot H \cdot H$, and so on, where the symbol · denotes Galois field multiplication.

In block 910, the security engine 200 checks for input MMIO data. The MMIO data may be embodied as 32 bits or 64 bits of data. In block 912, the security engine 200 determines whether input data has been received. If so, the method 900 branches to block 916, described below. If no input data was received, the method 900 branches to block 914, in which the security engine 200 stalls the AES pipelines 202. When the AES pipelines 202 are stalled, they retain their state and are prepared to output encrypted values on the next clock cycle. After stalling the AES pipelines 202, the method 900 loops back to block 910 to continue checking for input MMIO data.

Referring back to block 912, if input data was received, the method 900 branches to block 916, in which the security engine 200 performs a cryptographic operation on the input data block. In some embodiments, in block 918 the security engine 200 may encrypt the input data using an AES pipeline 202. For example, the security engine 200 may encrypt plaintext data received from the accelerator 136 before it is transferred to the processor 120, as in an MMIO read response. In some embodiments, in block 920 the security engine 200 may decrypt the input data using an AES pipeline 202. For example, the security engine 200 may decrypt ciphertext data received from the processor 120 before it is transferred to the accelerator 136, as in an MMIO write.

In block 922, the security engine 200 generates an authentication tag based on the ciphertext block(s). The ciphertext blocks may be the input data to the security engine 200 (e.g., for decryption operations) or the output data from the security engine 200 (e.g., for encryption operations). The AT may be generated using multiple GF multipliers 204 based on the ciphertext and one or more other values (e.g., hash subkeys H, $H^2$, $H^3$, additional authenticated information A, etc.). As described further below, the AT may be used by the processor 120 and/or the accelerator 136 to verify that an MMIO transaction was authentic and unaltered. After performing the cryptography operation and the authentication operation, the method 900 loops back to block 910 to continue monitoring for input MMIO data.

Figure 10:
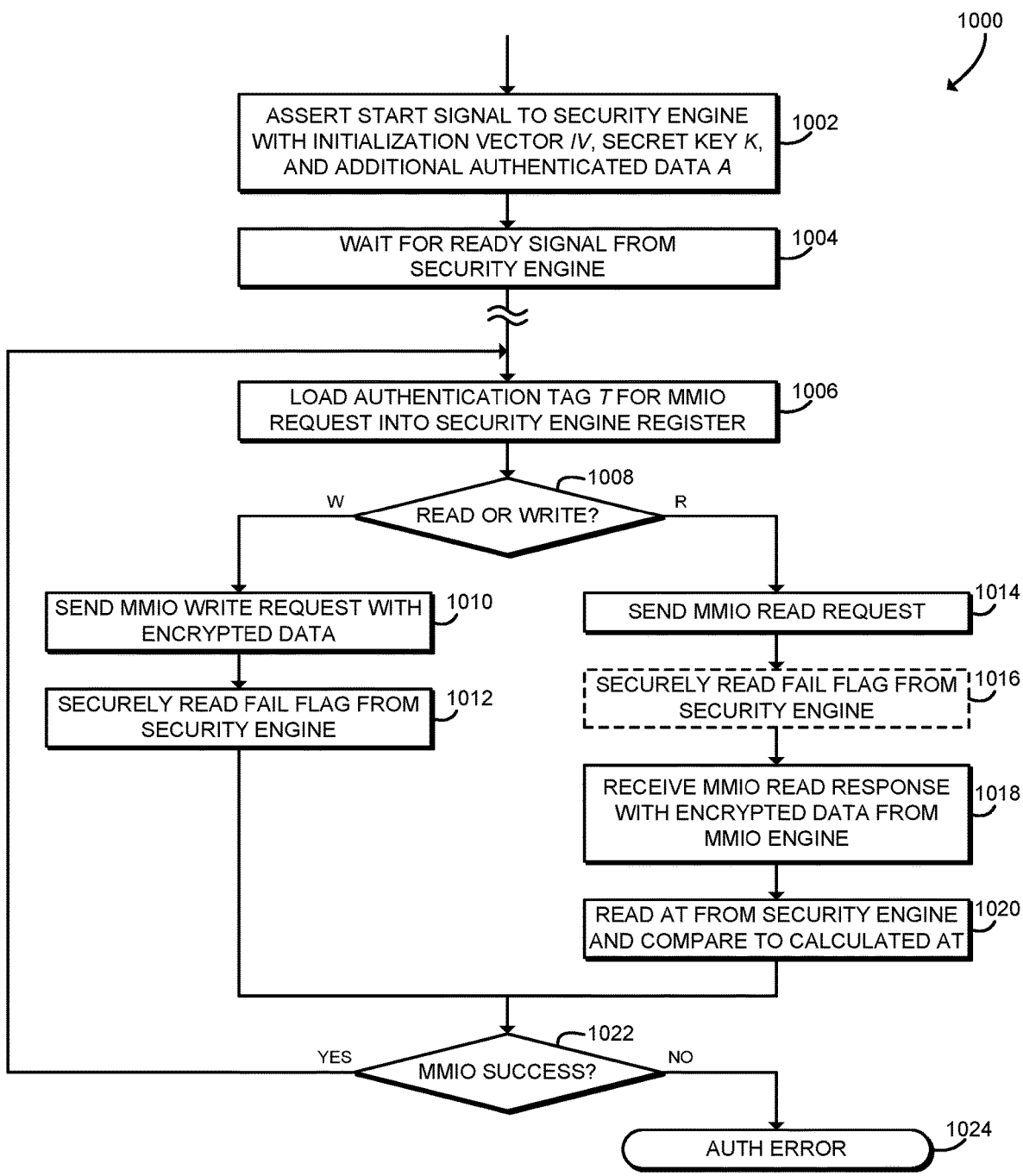
FIG. 10 is a simplified flow diagram of at least one embodiment of a method for memory-mapped I/O (MMIO) transfer management may be executed by the computing device of FIGS. 1-3.

Referring now to FIG. 10, in use, the computing device 100 may execute a method 1000 for MMIO transaction block management. It should be appreciated that, in some embodiments, the operations of the method 1000 may be performed by one or more components of the environment 300 of the computing device 100 as shown in FIG. 3, such as the trusted execution environment 302. The method 1000 begins in block 1002, in which the processor 120 asserts a start signal to the secure MMIO engine 140. The processor 120 provides the initialization vector IV, secret key K, and additional authenticated data A to the secure MMIO engine 140. The processor 120 may use any technique to security communicate that data to the secure MMIO engine 140. As described above, IV is a nonce value associated with a block of MMIO transactions, and may be determined according to one or more AES-GCM specifications. The secret key K may be embodied as any symmetric encryption key used to protect data transferred between the processor 120 and the accelerator 136. The key K may be protected from unauthorized disclosure by the trusted execution environment 302, for example by being maintained in a secure enclave established using the secure enclave support 122 of the processor 120. The additional authenticated data A may be embodied as any addressing data, metadata, or other data related to the MMIO transaction that will be authenticated but not encrypted by the secure MMIO engine 140. In response to the start signal, the secure MMIO engine 140 performs an initialization process as described above. One potential embodiment of a method for initialization is described above in connection with FIG. 6.

In block 1004, the processor 120 waits for a ready for data signal to be asserted by the secure MMIO engine 140. As described above, the ready for data signal is asserted when the secure MMIO engine 140 completes its initialization process. The processor 120 may poll, wait for an interrupt, or otherwise monitor for the ready for data signal. After the ready for data signal is asserted, the method 1000 proceeds to block 1006.

In block 1006, the processor 120 loads an expected value of the authentication tag T for an MMIO request into a register of the secure MMIO engine 140. The MMIO request may be embodied as an MMIO write request or an MMIO read request. The tag T may be determined by the processor 120, for example by the trusted execution environment 302, based on one or more AES-GCM specifications. In particular, the expected tag T may depend upon the ciphertext C and additional authenticated data A of the MMIO request. If the ciphertext C is not known ahead of time, for example for MMIO read requests, the tag T may be based on A with no C (e.g., C of length zero) or with a predetermined constant C or other known value of C (e.g., a zero block). As described further below, MMIO read responses may be generated by the accelerator 136, and thus the processor 120 does not predetermine a tag T for MMIO read responses.

In block 1008, the method 1000 switches based on whether the MMIO request is an MMIO write request or an MMIO read request. If the MMIO request is a read request, the method 1000 branches to block 1014, described below. If the MMIO request is a write request, the method 100 branches to block 1010.

In block 1010, the processor 120 sends an MMIO write request to the secure MMIO engine 140, including encrypted data (ciphertext) to be written to the accelerator 136. As described further below, the encrypted data may be decrypted by the secure MMIO engine 140 and transferred to the accelerator 136. The MMIO write request may be issued by the processor 120 using the MMIO engine 128 or other typical components of the processor 120 or SoC. MMIO requests are typically performed with small (e.g., 64-bit) payloads, and there may be an MMIO request every clock cycle that requires confidentiality and integrity protection. The execution of an MMIO transaction is conditional on the integrity of the MMIO transaction request. The MMIO request may include an address in MMIO space, encrypted data, or other data associated with the MMIO request. One potential embodiment of a method for processing MMIO write requests that may be performed by the secure MMIO engine 140 is described below in connection with FIG. 11.

In block 1012, the processor 120 securely reads a fail flag from the secure MMIO engine 140. As described further below, for MMIO write requests the secure MMIO engine 140 calculates a final AT value and compares it to the expected AT value provided by the processor 120 in connection with block 1006. If the final AT value and the expected AT value do not match, then the secure MMIO engine 140 sets the fail flag. After reading the fail flag, the method 1000 advances to block 1022.

In block 1022, the processor 120 checks whether the MMIO write request was successfully performed (e.g., whether or not the fail flag was set). If the write was not successful, the method 1000 branches to block 1024, in which the processor 120 indicates an authentication error. Referring back to block 1022, if the MMIO write request was successfully performed, the method 1000 loops back to block 1006, in which the processor 120 may perform additional MMIO requests.

Referring back to block 1008, if the MMIO request is a read request, the method 1000 branches to block 1014, in which the processor 120 sends an MMIO read request. The MMIO read request may be issued by the processor 120 using the MMIO engine 128 or other typical components of the processor 120 or SoC. As described above, MMIO requests are typically performed with small (e.g., 64-bit) payloads, and there may be an MMIO request every clock cycle that requires confidentiality and integrity protection. The execution of the MMIO transaction is conditional on the integrity of the MMIO transaction request. The MMIO read request may include an address in MMIO space or other data associated with the MMIO read request. One potential embodiment of a method for processing MMIO read requests that may be performed by a secure MMIO engine 140 is described below in connection with FIG. 11.

In some embodiments, in block 1016, the processor 120 securely reads a fail flag from the secure MMIO engine 140. As described further below, for MMIO read requests the secure MMIO engine 140 calculates a final AT value and compares it to the expected AT value provided by the processor 120 in connection with block 1006. If the final AT value and the expected AT value do not match, then the secure MMIO engine 140 sets the fail flag.

In block 1018 the processor 120 may receive an MMIO read response with encrypted data (ciphertext) from the secure MMIO engine 140. As described further below, the encrypted data may be generated by the secure MMIO engine 140, which may read plaintext data from the accelerator device 136. In some embodiments, the MMIO read response may be received only if the MMIO read request was successful. Additionally or alternatively, in some embodiments an arbitrary MMIO read response may be returned if the MMIO read request was not successful. Additionally or alternatively, in some embodiments a poisoned MMIO read response may be returned if the MMIO read request was not successful. The poisoned response and AT will be calculated to guarantee the AT generated by the secure MMIO engine 140 mismatches the AT calculated by the processor 120 on the poisoned response. One potential embodiment of a method for processing MMIO read responses that may be performed by a secure MMIO engine 140 is described below in connection with FIG. 11. Additionally or alternatively, although illustrated as being performed by the same secure MMIO engine 140, in some embodiments, a different secure MMIO engine 140 may process MMIO transactions in each direction. For example, two different secure MMIO engines 140 may process MMIO requests (read requests and write requests) and MMIO read responses, respectively.

In block 1020 the processor 120 reads a final AT value from the secure MMIO engine 140 and compares that value to an AT value for the MMIO read response calculated by the processor 120. The calculated AT value may be determined by the processor 120 based on the ciphertext received in the MMIO read response. If the final AT value matches the calculated AT value, then the MMIO read response was performed successfully. If the final AT value does not match, then either the MMIO read response was not performed successfully or the MMIO read request was not performed successfully. For example, as described further below, if the MMIO read request is not successful, the secure MMIO engine 140 may return an arbitrary MMIO read response and a poisoned AT value that does not match the MMIO read response.

In block 1022 the processor 120 checks whether the MMIO read request was successfully performed. For example, the processor 120 may determine whether or not the fail flag was set after sending the MMIO read request and/or the processor 120 may determine whether the AT received from the secure MMIO engine 140 matches the calculated AT for the MMIO read response. If the MMIO read request was not successful, the method 1000 branches to block 1024, in which the processor 120 indicates an authentication error. Referring back to block 1022, if the MMIO read request was successfully performed, the method 1000 loops back to block 1006, in which the processor 120 may perform additional MMIO requests.

Figure 11:
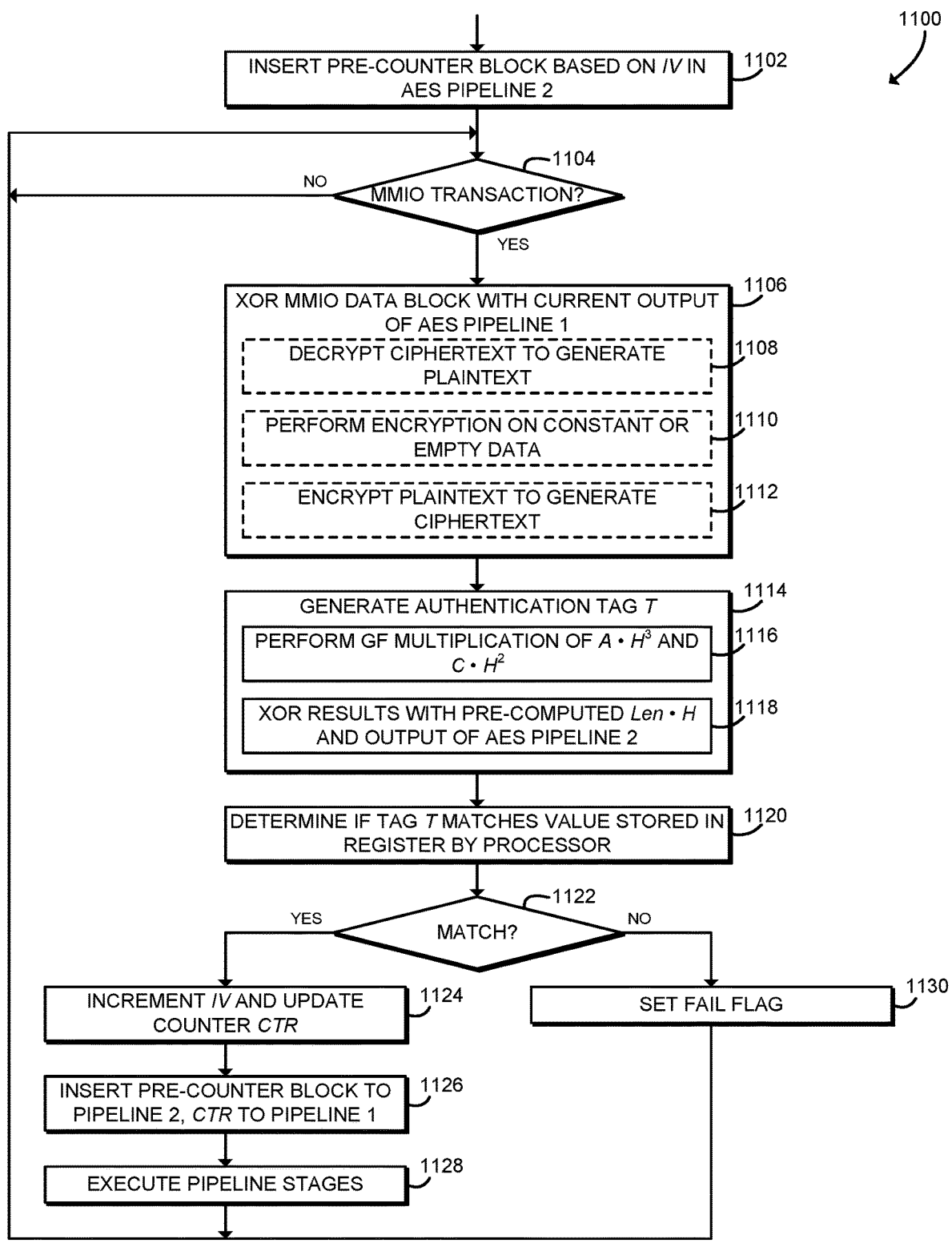
FIG. 11 is a simplified flow diagram of at least one embodiment of a method for MMIO transfers may be executed by the hardware security engine of the computing device of FIGS. 1-3.

Referring now to FIG. 11, in use, the secure MMIO engine 140 of the computing device 100 may execute a method 1100 for performing secure MMIO transactions, including MMIO read requests, MMIO write requests, and/or MMIO read responses. It should be appreciated that, in some embodiments, the operations of the method 1100 may be performed by one or more components of the environment 300 of the computing device 100 as shown in FIG. 3, such as the security engine 200 (e.g., the secure MMIO engine 140). The method 1100 begins in block 1102, in which the secure MMIO engine 140 inserts a pre-counter block based on IV into an AES pipeline 202 (pipeline 2). The pre-counter block may be determined according to one or more AES-GCM specifications. For example, the pre-counter block may be determined as $IV\|(1d^{32})$, that is, IV concatenated with a 32-bit counter value equal to decimal 1. To reduce latency, the pre-counter block may be inserted during initialization of the secure MMIO engine 140 or otherwise before processing MMIO transaction. For example, the pre-counter block may be inserted during initialization as described above in connection with block 902 of FIG. 9 and in connection with FIG. 6.

In block 1104, the secure MMIO engine 140 determines whether an MMIO transaction has been received. The MMIO transaction may be an MMIO read request, an MMIO write request, or an MMIO read response. MMIO read requests and MMIO write requests may be received from the processor 120, and MMIO read responses may be received from the accelerator 136. Additionally or alternatively, as described above, in some embodiments separate MMIO engines 140 may receive MMIO requests (MMIO read requests and MMIO write requests) and MMIO read responses, respectively. If no MMIO transaction was received, the method 1100 loops back to block 1104 to continue waiting for MMIO transactions. While waiting for transactions, the AES pipelines 202 of the secure MMIO engine 140 may be stalled to preserve pipeline state. If an MMIO transaction is received, then the method 1100 advances to block 1106.

In block 1106, the secure MMIO engine 140 bitwise exclusive ORs (XOR, or the symbol ⊕) the input data block with the current output of an AES pipeline 202 (pipeline 1). The input data block may be 32 bits or 64 bits in length. The AES pipeline 1 was primed with counter blocks during initialization of the secure MMIO engine 140 as described above in connection with block 902 of FIG. 9 and with FIG. 6. Thus, XORing the output of the pipeline 1 with the input data performs a cryptographic operation on the input data. In some embodiments, in block 1108 the secure MMIO engine 140 decrypts ciphertext C to generate plaintext P, for example when processing an MMIO write request from the processor 120. In that example, the secure MMIO engine 140 calculates P=C⊕202. In some embodiments, in block 1110 the secure MMIO engine 140 performs an encryption operation with a predetermined constant ciphertext C or an empty ciphertext C, for example when processing an MMIO read request from the processor 120. The predetermined ciphertext C may be, for example, a block of data with each bit set to zero. In that example, the MMIO read request does not include a data payload, and thus the cryptographic operation may be performed to facilitate generation of the authentication tag T. In some embodiments, in block 1112 the secure MMIO engine 140 encrypts plaintext P to generate ciphertext C, for example when processing an MMIO read response from the accelerator 136. In that example, the secure MMIO engine 140 calculates C=P⊕202.

In block 1114, the secure MMIO engine 140 generates a final authentication tag T for the MMIO transaction. The tag T may be generated according to one or more AES-GCM specifications. The generation of the final authentication tag T may be performed according to Equation 6, below. In block 1116, the secure MMIO engine 140 performs GF multiplications of $A \cdot H^3$ and $C \cdot H^2$ using two GF multipliers 204. As described above, in some embodiments the ciphertext C may be a predetermined constant value (e.g., a zero block) for MMIO read requests or other transactions that do not include a data payload. In block 1118, the secure MMIO engine 140 performs a bitwise XOR of the results of the GF multiplication as well as the pre-computed value of Len·H and the output of the AES pipeline 202 that encrypted the pre-counter block (pipeline 2). As described above, the length of MMIO transactions is known, and thus the value Len·H may be precomputed during initialization. Because the value Len·H is precomputed, using two GF multipliers 204 in parallel may allow the operations of Equation 6 to be completed in one clock cycle. Thus, when input data is received during a clock cycle, the ciphertext/plaintext and the AT may be generated in the following clock cycle. As described above, the AES pipelines 202 (pipeline 1 and pipeline 2) are pre-filled during initialization, which hides the pipeline latency.

$$T = A \cdot H^3 \oplus C \cdot H^2 \oplus Len \cdot H \oplus CIPH_K(IV\|1d^{32}) \qquad (6)$$

In block 1120, the secure MMIO engine 140 may determine whether the final AT value T matches an AT value stored in a register by the processor 120 before the MMIO transaction. As described above in connection with FIG. 10, the processor 120 may write the expected AT value before issuing an MMIO write request or an MMIO read request. If the final AT value does not match the expected AT value, then an error or attempted attack (e.g., attempted splicing attack or DoS attack) may have occurred. For example, writes to the AT register and MMIO transaction requests may be non-atomic, which may allow an attacker to write an incorrect value to the AT register and/or send a false MMIO request. In those circumstances, the AT values would not match, indicating a potential attack. As another example, a malicious actor may submit an improper MMIO transaction request (e.g., an MMIO transaction request with an incorrect AT). In block 1122, the secure MMIO engine 140 checks whether the AT values match. If not, the method 1100 branches to block 1130, described below. If the AT values match, the method 1100 branches to block 1124. It should be understood that for MMIO read responses generated by the accelerator 136, the processor 120 does not write an expected AT value and thus the secure MMIO engine 140 may not check AT values. If no AT check is performed, the method 1100 advances to block 1124.

In block 1124, the secure MMIO engine 140 increments IV and updates the associated counter CTR. For a blocked session of multiple MMIO transactions, the value for IV may be incremented for each MMIO transaction. The counter block may be determined according to one or more AES-GCM specifications. As described above, CTR may be determined as $CTR=IV\|(2d^{32})$, that is, a 128-bit value equal to IV concatenated with a 32-bit counter initialized to the decimal value "2." In block 1126, the secure MMIO engine 140 inserts the CTR block to pipeline 1 and a pre-counter block to pipeline 2. As described above, the pre-counter block may be determined as IV∥1d'$^{32}$, that is, IV concatenated with a 32-bit counter initialized to decimal "1." In block 1128, the AES pipeline stages are executed. Accordingly, because CTR and the pre-counter block may be pre-determined and pre-executed, the AES pipelines 202 for performing the cryptographic operation and generating the tag T (i.e., pipeline 1 and pipeline 2) are pre-filled to reduce latency for subsequent MMIO transactions in the same block of transactions. After executing the pipeline stages, the method 1100 loops back to block 1104 to process additional MMIO transactions.

Referring back to block 1122, if the AT value written by the processor 120 and the final AT value generated by the secure MMIO engine 140 do not match, the method 1100 branches to block 1130, in which the secure MMIO engine 140 sets the fail flag. In response to a mismatch, the secure MMIO engine 140 may drop packets or otherwise prevent the MMIO transaction from reaching the accelerator 136. Thus, the secure MMIO engine 140 may prevent splicing or spoofing attacks and other improperly formed MMIO requests. For a mismatched MMIO read request, the secure MMIO engine 140 may send an arbitrary MMIO read response and store a poisoned AT (e.g., a mismatched AT or other AT that indicates failure) that may allow the processor 120 to detect the authentication failure. Additionally or alternatively, storing a poisoned AT may not be necessary if the processor 120 checks the fail flag for success of the MMIO read request. Note that in the case of an AT mismatch, the secure MMIO engine 140 does not increment IV or the CTR block and does not execute any pipeline stages. Thus, the state of the secure MMIO engine 140 is unchanged, and the processor 120 (e.g., the trusted execution environment 302) and the secure MMIO engine 140 may remain synchronized for future MMIO transactions. Accordingly, by avoiding the need to re-synchronize after an incorrect AT and/or MMIO transaction, the MMIO engine may prevent certain denial-of-service (DoS) attacks without additional performance overhead. After setting the fail flag, the method 1100 loops back to block 1104 in which the secure MMIO engine 140 processes additional MMIO transactions.

It should be appreciated that, in some embodiments, the methods 400, 500, 600, 700, 900, 1000, and/or 1100 may be embodied as various instructions stored on a computer-readable media, which may be executed by the processor 120, the I/O subsystem 124, the secure DMA engine 138, the secure MMIO engine 140, the accelerator 136, and/or other components of the computing device 100 to cause the computing device 100 to perform the respective method 400, 500, 600, 700, 900, 1000, and/or 1100. The computer-readable media may be embodied as any type of media capable of being read by the computing device 100 including, but not limited to, the memory 130, the data storage device 132, firmware devices, other memory or data storage devices of the computing device 100, portable media readable by a peripheral device 142 of the computing device 100, and/or other media.

EXAMPLES

Illustrative examples of the technologies disclosed herein are provided below. An embodiment of the technologies may include any one or more, and any combination of, the examples described below.

Example 1 includes a computing device for secure data transfer, the computing device comprising: a hardware security engine that comprises a plurality of block cipher pipelines and a plurality of Galois field multipliers; an initialization manager to initialize the hardware security engine with an initialization vector and a secret key; and a transfer manager to initiate a data transfer operation between a trusted execution environment of the computing device and an accelerator device of the computing device in response to initialization of the hardware security engine; wherein the hardware security engine is to perform an authenticated cryptographic operation for the data transfer operation in response to initiation of the data transfer operation.

Example 2 includes the subject matter of Example 1, and wherein each block cipher pipeline of the plurality of block cipher pipelines comprises a 128-bit AES block cipher pipeline.

Example 3 includes the subject matter of any of Examples 1 and 2, and wherein to perform the authenticated cryptographic operation comprises to perform an authenticated encryption operation or an authenticated decryption operation.

Example 4 includes the subject matter of any of Examples 1-3, and wherein the authenticated cryptographic operation comprises an AES Galois/Counter mode (AES-GCM) cryptographic operation.

Example 5 includes the subject matter of any of Examples 1-4, and wherein to initialize the hardware security engine comprises to: insert a zero block into a first block cipher pipeline, wherein the each bit of the zero block equals zero; derive, by the hardware security engine, a hash subkey as a function of an output of the first block cipher pipeline in response to inserting the zero block; initialize an initial counter block as a function of the initialization vector; and insert, for each block cipher pipeline of the plurality of block cipher pipelines, a counter block based on the initial counter block into the block cipher pipeline.

Example 6 includes the subject matter of any of Examples 1-5, and wherein to initialize the hardware security engine further comprises to: receive a start signal by the hardware security engine; and assert a ready signal by the hardware security engine in response to insertion of the counter block; wherein to insert the zero block comprises to insert the zero block in response to receipt of the start signal, and wherein to initialize the initial counter block comprises to initialize the initial counter block in response to the receipt of the start signal.

Example 7 includes the subject matter of any of Examples 1-6, and wherein to initialize the hardware security engine further comprises to: execute, by the hardware security engine, a predetermined number of block cipher rounds with the plurality of block cipher pipelines in response to the insertion of the counter block; wherein to assert the ready signal further comprises to assert the ready signal in response to execution of the predetermined number of block cipher rounds.

Example 8 includes the subject matter of any of Examples 1-7, and wherein to initialize the hardware security engine further comprises to stall the plurality of block cipher pipelines in response to the execution of the predetermined number of block cipher rounds.

Example 9 includes the subject matter of any of Examples 1-8, and wherein: to initiate the data transfer operation comprises to initiate a direct memory access operation with a plurality of input data blocks; and to perform the authenticated cryptographic operation comprises to: perform, by the hardware security engine, a cryptographic operation with the plurality of block cipher pipelines on the plurality of input data blocks to generate a plurality of output data blocks; and update, by the hardware security engine, an intermediate authentication tag value register based on a plurality of ciphertext blocks, wherein the plurality of ciphertext blocks comprises the plurality of input data blocks or the plurality of output data blocks.

Example 10 includes the subject matter of any of Examples 1-9, and wherein the authenticated cryptographic operation comprises an authenticated encryption operation and the plurality of ciphertext blocks comprises the plurality of output data blocks.

Example 11 includes the subject matter of any of Examples 1-10, and wherein the authenticated cryptographic operation comprises an authenticated decryption operation and the plurality of ciphertext blocks comprises the plurality of input data blocks.

Example 12 includes the subject matter of any of Examples 1-11, and wherein to perform the cryptographic operation comprises to: read, by the hardware security engine, the plurality of input data blocks; bitwise exclusive OR, by the hardware security engine, each of the plurality of input data blocks with an output of a block cipher pipeline to generate the plurality of output data blocks; and insert, for each block cipher pipeline of the plurality of block cipher pipelines, an incremented counter block into the block cipher pipeline in response to a bitwise exclusive OR.

Example 13 includes the subject matter of any of Examples 1-12, and wherein to update the intermediate authentication tag value comprises to perform, for each ciphertext block of the plurality of ciphertext blocks, a Galois field multiplication with a Galois field multiplier as a function of a hash subkey and the ciphertext block.

Example 14 includes the subject matter of any of Examples 1-13, and wherein the plurality of block cipher pipelines comprises four AES pipelines and the plurality of Galois field multipliers comprises five Galois field multipliers.

Example 15 includes the subject matter of any of Examples 1-14, and wherein the hardware security engine is further to: receive a last signal; and generate a final authentication tag value as a function of the intermediate authentication tag value register in response to receipt of the last signal.

Example 16 includes the subject matter of any of Examples 1-15, and wherein the transfer manager is further to: read, by the trusted execution environment, the final authentication tag value from the hardware security engine; calculate, by the trusted execution environment, an expected authentication tag value for the data transfer operation; and compare, by the trusted execution environment, the final authentication tag value to the expected authentication tag value.

Example 17 includes the subject matter of any of Examples 1-16, and wherein: to initiate the data transfer operation comprises to initiate a memory-mapped I/O operation with an input data block; and to perform the authenticated cryptographic operation comprises to: perform, by the hardware security engine, a cryptographic operation with a block cipher pipeline on the input data block to generate an output data block; and generate, by the hardware security engine, a final authentication tag value based on a ciphertext block, wherein the ciphertext block comprises the input data block or the output data block.

Example 18 includes the subject matter of any of Examples 1-17, and wherein the authenticated cryptographic operation comprises an authenticated encryption operation and the ciphertext block comprises the output data block.

Example 19 includes the subject matter of any of Examples 1-18, and wherein the authenticated cryptographic operation comprises an authenticated decryption operation and the ciphertext block comprises the input data block.

Example 20 includes the subject matter of any of Examples 1-19, and wherein: the transfer manager is further to (i) calculate, by the trusted execution environment, an expected authentication tag value for the data transfer operation, and (ii) write, by the trusted execution environment, the expected authentication tag value to the hardware security engine; and the hardware security engine is to compare the expected authentication tag value to the final authentication tag value.

Example 21 includes the subject matter of any of Examples 1-20, and wherein to perform the cryptographic operation comprises to: read, by the hardware security engine, the input data block; bitwise exclusive OR, by the hardware security engine, the input data block with an output of the block cipher pipeline to generate the output data block; and insert an incremented counter block into the block cipher pipeline in response to a bitwise exclusive ORing and in response to comparison of the expected authentication tag value to the final authentication tag value.

Example 22 includes the subject matter of any of Examples 1-21, and wherein to generate the final authentication tag value comprises to perform a Galois field multiplication with a Galois field multiplier as a function of a hash subkey and the ciphertext block.

Example 23 includes the subject matter of any of Examples 1-22, and wherein the plurality of block cipher pipelines comprises two AES pipelines and the plurality of Galois field multipliers comprises two Galois field multipliers.

Example 24 includes a method for secure data transfer, the method comprising: initializing, by a computing device, a hardware security engine of the computing device with an initialization vector and a secret key, wherein the hardware security engine comprises a plurality of block cipher pipelines and a plurality of Galois field multipliers; initiating, by the computing device, a data transfer operation between a trusted execution environment of the computing device and an accelerator device of the computing device in response to initializing the hardware security engine; and performing, by the hardware security engine, an authenticated cryptographic operation for the data transfer operation in response to initiating the data transfer operation.

Example 25 includes the subject matter of any of Example 24, and wherein each block cipher pipeline of the plurality of block cipher pipelines comprises a 128-bit AES block cipher pipeline.

Example 26 includes the subject matter of any of Examples 24 and 25, and wherein performing the authenticated cryptographic operation comprises performing an authenticated encryption operation or an authenticated decryption operation.

Example 27 includes the subject matter of any of Examples 24-26, and wherein the authenticated cryptographic operation comprises an AES Galois/Counter mode (AES-GCM) cryptographic operation.

Example 28 includes the subject matter of any of Examples 24-27, and wherein initializing the hardware security engine comprises: inserting a zero block into a first block cipher pipeline, wherein the each bit of the zero block equals zero; deriving, by the hardware security engine, a hash subkey as a function of an output of the first block cipher pipeline in response to inserting the zero block; initializing an initial counter block as a function of the initialization vector; and inserting, for each block cipher pipeline of the plurality of block cipher pipelines, a counter block based on the initial counter block into the block cipher pipeline.

Example 29 includes the subject matter of any of Examples 24-28, and wherein initializing the hardware security engine further comprises: receiving a start signal by the hardware security engine; and asserting a ready signal by the hardware security engine in response to inserting the counter block; wherein inserting the zero block comprises inserting the zero block in response to receiving the start signal, and wherein initializing the initial counter block comprises initializing the initial counter block in response to receiving the start signal.

Example 30 includes the subject matter of any of Examples 24-29, and wherein initializing the hardware security engine further comprises: executing, by the hardware security engine, a predetermined number of block cipher rounds with the plurality of block cipher pipelines in response to inserting the counter block; wherein asserting the ready signal further comprises asserting the ready signal in response to executing the predetermined number of block cipher rounds.

Example 31 includes the subject matter of any of Examples 24-30, and wherein initializing the hardware security engine further comprises stalling the plurality of block cipher pipelines in response to executing the predetermined number of block cipher rounds.

Example 32 includes the subject matter of any of Examples 24-31, and wherein: initiating the data transfer operation comprises initiating a direct memory access operation with a plurality of input data blocks; and performing the authenticated cryptographic operation comprises: performing, by the hardware security engine, a cryptographic operation with the plurality of block cipher pipelines on the plurality of input data blocks to generate a plurality of output data blocks; and updating, by the hardware security engine, an intermediate authentication tag value register based on a plurality of ciphertext blocks, wherein the plurality of ciphertext blocks comprises the plurality of input data blocks or the plurality of output data blocks.

Example 33 includes the subject matter of any of Examples 24-32, and wherein the authenticated cryptographic operation comprises an authenticated encryption operation and the plurality of ciphertext blocks comprises the plurality of output data blocks.

Example 34 includes the subject matter of any of Examples 24-33, and wherein the authenticated cryptographic operation comprises an authenticated decryption operation and the plurality of ciphertext blocks comprises the plurality of input data blocks.

Example 35 includes the subject matter of any of Examples 24-34, and wherein performing the cryptographic operation comprises: reading, by the hardware security engine, the plurality of input data blocks; bitwise exclusive ORing, by the hardware security engine, each of the plurality of input data blocks with an output of a block cipher pipeline to generate the plurality of output data blocks; and inserting, for each block cipher pipeline of the plurality of block cipher pipelines, an incremented counter block into the block cipher pipeline in response to bitwise exclusive ORing.

Example 36 includes the subject matter of any of Examples 24-35, and wherein updating the intermediate authentication tag value comprises performing, for each ciphertext block of the plurality of ciphertext blocks, a Galois field multiplication with a Galois field multiplier as a function of a hash subkey and the ciphertext block.

Example 37 includes the subject matter of any of Examples 24-36, and wherein the plurality of block cipher pipelines comprises four AES pipelines and the plurality of Galois field multipliers comprises five Galois field multipliers.

Example 38 includes the subject matter of any of Examples 24-37, and further comprising: receiving, by the hardware security engine, a last signal; and generating, by the hardware security engine, a final authentication tag value as a function of the intermediate authentication tag value register in response to receiving the last signal.

Example 39 includes the subject matter of any of Examples 24-38, and further comprising: reading, by the trusted execution environment, the final authentication tag value from the hardware security engine; calculating, by the trusted execution environment, an expected authentication tag value for the data transfer operation; and comparing, by the trusted execution environment, the final authentication tag value to the expected authentication tag value.

Example 40 includes the subject matter of any of Examples 24-39, and wherein: initiating the data transfer operation comprises initiating a memory-mapped I/O operation with an input data block; and performing the authenticated cryptographic operation comprises: performing, by the hardware security engine, a cryptographic operation with a block cipher pipeline on the input data block to generate an output data block; and generating, by the hardware security engine, a final authentication tag value based on a ciphertext block, wherein the ciphertext block comprises the input data block or the output data block.

Example 41 includes the subject matter of any of Examples 24-40, and wherein the authenticated cryptographic operation comprises an authenticated encryption operation and the ciphertext block comprises the output data block.

Example 42 includes the subject matter of any of Examples 24-41, and wherein the authenticated cryptographic operation comprises an authenticated decryption operation and the ciphertext block comprises the input data block.

Example 43 includes the subject matter of any of Examples 24-42, and further comprising: calculating, by the trusted execution environment, an expected authentication tag value for the data transfer operation; writing, by the trusted execution environment, the expected authentication tag value to the hardware security engine; and comparing, by the hardware security engine, the expected authentication tag value to the final authentication tag value.

Example 44 includes the subject matter of any of Examples 42-43, and wherein performing the cryptographic operation comprises: reading, by the hardware security engine, the input data block; bitwise exclusive ORing, by the hardware security engine, the input data block with an output of the block cipher pipeline to generate the output data block; and inserting an incremented counter block into the block cipher pipeline in response to bitwise exclusive ORing and in response to comparing the expected authentication tag value to the final authentication tag value.

Example 45 includes the subject matter of any of Examples 24-44, and wherein generating the final authentication tag value comprises performing a Galois field multiplication with a Galois field multiplier as a function of a hash subkey and the ciphertext block.

Example 46 includes the subject matter of any of Examples 24-45, and wherein the plurality of block cipher pipelines comprises two AES pipelines and the plurality of Galois field multipliers comprises two Galois field multipliers.

Example 47 includes a computing device comprising: a processor; and a memory having stored therein a plurality of instructions that when executed by the processor cause the computing device to perform the method of any of Examples 24-46.

Example 48 includes one or more non-transitory, computer readable storage media comprising a plurality of instructions stored thereon that in response to being executed result in a computing device performing the method of any of Examples 24-46.

Example 49 includes a computing device comprising means for performing the method of any of Examples 24-46.

The invention claimed is:

1. An apparatus comprising:
a security engine circuitry coupled to or hosted by one or more processors, wherein the security engine circuitry includes a plurality of block cipher pipelines and a plurality of Galois field multipliers;
an initialization manager circuitry configured to initialize the security engine circuitry with an initialization vector and a secret key, wherein an initial counter block is initialized as a function of the initialization vector. wherein the initial counter pipelines: and
a transfer manager circuitry configured to initiate a data transfer operation between a trusted execution environment and an accelerator device in response to initialization of the security engine circuitry,
wherein the security engine circuitry is configured to perform an authenticated cryptographic operation for the data transfer operation in response to initiation of the data transfer operation.

2. The apparatus of claim 1, wherein to initialize the security engine circuitry comprises to:
insert a zero block into a first block cipher pipeline, wherein one or more bits of the zero block equals zero;
derive, by the security engine circuitry, a hash subkey as a function of an output of the first block cipher pipeline in response to inserting the zero block; and
insert, for each block cipher pipeline of the plurality of block cipher pipelines, a counter block based on the initial counter block into the block cipher pipeline.

3. The apparatus of claim 2, wherein to initialize the security engine circuitry further comprises to:
receive a start signal by the security engine circuitry; and
assert a ready signal by the security engine circuitry in response to insertion of the counter block;
wherein to insert the zero block comprises to insert the zero block in response to receipt of the start signal, and wherein to initialize the initial counter block comprises to initialize the initial counter block in response to the receipt of the start signal.

4. The apparatus of claim 3, wherein to initialize the security engine circuitry further comprises to:
execute, by the hardware security engine circuitry, a predetermined number of block cipher rounds with the plurality of block cipher pipelines in response to the insertion of the counter block;
wherein to assert the ready signal further comprises to assert the ready signal in response to execution of the predetermined number of block cipher rounds.

5. The apparatus of claim 1, wherein:
to initiate the data transfer operation comprises to initiate a direct memory access operation with a plurality of input data blocks; and
to perform the authenticated cryptographic operation comprises to:
perform, by the security engine circuitry, a cryptographic operation with the plurality of block cipher pipelines on the plurality of input data blocks to generate a plurality of output data blocks; and
update, by the security engine circuitry, an intermediate authentication tag value register based on a plurality of ciphertext blocks, wherein the plurality of ciphertext blocks comprises the plurality of input data blocks or the plurality of output data blocks.

6. The apparatus of claim 5, wherein to update the intermediate authentication tag value comprises to perform, for each ciphertext block of the plurality of ciphertext blocks, a Galois field multiplication with a Galois field multiplier as a function of a hash subkey and the ciphertext block, wherein the plurality of block cipher pipelines comprises four AES pipelines and the plurality of Galois field multipliers comprises five Galois field multipliers, wherein the security engine circuitry is further to:
receive a last signal; and
generate a final authentication tag value as a function of the intermediate authentication tag value register in response to receipt of the last signal.

7. The apparatus of claim 5, wherein the transfer manager circuitry is further to:
read, by the trusted execution environment, the final authentication tag value from the hardware security engine;
calculate, by the trusted execution environment, an expected authentication tag value for the data transfer operation; and
compare, by the trusted execution environment, the final authentication tag value to the expected authentication tag value.

8. The apparatus of claim 1, wherein:
to initiate the data transfer operation comprises to initiate a memory-mapped I/O operation with an input data block; and
to perform the authenticated cryptographic operation comprises to:
perform, by the security engine circuitry, a cryptographic operation with a block cipher pipeline on the input data block to generate an output data block; and
generate, by the security engine circuitry, a final authentication tag value based on a ciphertext block, wherein the ciphertext block comprises the input data block or the output data block.

9. The apparatus of claim 8, wherein:
the transfer manager circuitry is further to (i) calculate, by the trusted execution environment, an expected authentication tag value for the data transfer operation, and (ii) write, by the trusted execution environment, the expected authentication tag value to the hardware\security engine circuitry; and
the security engine circuitry is to compare the expected authentication tag value to the final authentication tag value.

10. The apparatus of claim 9, wherein to perform the cryptographic operation comprises to:
  read, by the security engine circuitry, the input data block;
  bitwise exclusive OR, by the security engine circuitry, the input data block with an output of the block cipher pipeline to generate the output data block; and
  insert an incremented counter block into the block cipher pipeline in response to a bitwise exclusive ORing and in response to comparison of the expected authentication tag value to the final authentication tag value, wherein the plurality of block cipher pipelines comprises two AES pipelines and the plurality of Galois field multipliers comprises two Galois field multipliers.

11. A method comprising:
  initializing, by one or more processors of a computing device, a security engine circuitry of the computing device with an initialization vector and a secret key, wherein an initial counter block is initialized as a function of the initialization vector, wherein the security engine circuitry comprises a plurality of block cipher pipelines and a plurality of Galois field multipliers, and wherein the initial counter block is utilized in
  initiating a data transfer operation between a trusted execution environment and an accelerator device in response to initializing the security engine circuitry; and
  performing an authenticated cryptographic operation for the data transfer operation in response to initiating the data transfer operation.

12. The method of claim 11, wherein initializing the security engine circuitry comprises:
  inserting a zero block into a first block cipher pipeline, wherein one or more bits of the zero block equals zero;
  deriving, by the hardware security engine, a hash subkey as a function of an output of the first block cipher pipeline in response to inserting the zero block; and
  inserting, for each block cipher pipeline of the plurality of block cipher pipelines, a counter block based on the initial counter block into the block cipher pipeline.

13. The method of claim 11, wherein:
  initiating the data transfer operation comprises initiating a direct memory access operation with a plurality of input data blocks; and
  performing the authenticated cryptographic operation comprises:
    performing a cryptographic operation with the plurality of block cipher pipelines on the plurality of input data blocks to generate a plurality of output data blocks; and
    updating an intermediate authentication tag value register based on a plurality of ciphertext blocks, wherein the plurality of ciphertext blocks comprises the plurality of input data blocks or the plurality of output data blocks.

14. The method of claim 13, further comprising:
  receiving a last signal; and
  generating a final authentication tag value as a function of the intermediate authentication tag value register in response to receiving the last signal.

15. The method of claim 11, wherein:
  initiating the data transfer operation comprises initiating a memory-mapped I/O operation with an input data block; and
  performing the authenticated cryptographic operation comprises:
    performing a cryptographic operation with a block cipher pipeline on the input data block to generate an output data block; and
    generating a final authentication tag value based on a ciphertext block, wherein the ciphertext block comprises the input data block or the output data block.

16. The method of claim 15, further comprising:
  calculating an expected authentication tag value for the data transfer operation;
  writing the expected authentication tag value to the hardware security engine; and
  comparing the expected authentication tag value to the final authentication tag value.

17. At least one non-transitory computer-readable medium having stored thereon instructions which, when executed, cause a computing device to perform operations comprising:
  initializing a security engine circuitry of the computing device with an initialization vector and a secret key, wherein an initial counter block is initialized as a function of the initialization vector, wherein the security engine circuitry comprises a plurality of block cipher pipelines and a plurality of Galois field multipliers and wherein the initial counter pipelines:
  initializing a data transfer operation between a trusted execution environment and an accelerator device in response to initializing the security engine circuitry; and
  performing an authenticated cryptographic operation for the data transfer operation in response to initiating the data transfer operation.

18. The non-transitory computer-readable medium of claim 17, wherein initializing the security engine circuitry comprises:
  inserting a zero block into a first block cipher pipeline, wherein one or more bits of the zero block equals zero;
  deriving a hash subkey as a function of an output of the first block cipher pipeline in response to inserting the zero block; and
  inserting, for each block cipher pipeline of the plurality of block cipher pipelines, a counter block based on the initial counter block into the block cipher pipeline.

19. The non-transitory computer-readable medium of claim 17, wherein:
  to initiate the data transfer operation comprises to initiate a direct memory access operation with a plurality of input data blocks; and
  to perform the authenticated cryptographic operation comprises to:
    perform a cryptographic operation with the plurality of block cipher pipelines on the plurality of input data blocks to generate a plurality of output data blocks; and
    update an intermediate authentication tag value register based on a plurality of ciphertext blocks, wherein the plurality of ciphertext blocks comprises the plurality of input data blocks or the plurality of output data blocks.

20. The non-transitory computer-readable medium of claim 19, further comprising a plurality of instructions stored thereon that, in response to being executed, cause the computing device to perform the one or more operations comprising:
  receiving a last signal; and
  generate, by the hardware security engine, generating a final authentication tag value as a function of the intermediate authentication tag value register in response to receiving the last signal.

21. The non-transitory computer-readable medium of claim 17, wherein:
  to initiate the data transfer operation comprises to initiate a memory-mapped I/O operation with an input data block; and
  to perform the authenticated cryptographic operation comprises to:
    perform a cryptographic operation with a block cipher pipeline on the input data block to generate an output data block; and
    generate, a final authentication tag value based on a ciphertext block, wherein the ciphertext block comprises the input data block or the output data block.

22. The non-transitory computer-readable medium of claim 21, further comprising a plurality of instructions stored thereon that, in response to being executed, cause the computing device to perform the one or more operations comprising:
  calculating an expected authentication tag value for the data transfer operation;
  writing the expected authentication tag value to the hardware security engine; and
  comparing the expected authentication tag value to the final authentication tag value.

* * * * *